United States Patent
He et al.

(10) Patent No.: US 12,465,223 B2
(45) Date of Patent: Nov. 11, 2025

(54) DUAL-ALTITUDE-BASED NON-INVASIVE BLOOD PRESSURE MONITORING

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 762 days.

(21) Appl. No.: 17/851,051

(22) Filed: Jun. 28, 2022

(65) Prior Publication Data
US 2023/0414115 A1    Dec. 28, 2023

(51) Int. Cl.
*A61B 5/021* (2006.01)
*A61B 5/024* (2006.01)

(52) U.S. Cl.
CPC ...... *A61B 5/02108* (2013.01); *A61B 5/02416* (2013.01)

(58) Field of Classification Search
CPC . A61B 5/02108; A61B 5/02416; A61B 5/681; A61B 5/6826; A61B 5/02438; A61B 5/72
See application file for complete search history.

(56) References Cited

U.S. PATENT DOCUMENTS

| | | | | |
|---|---|---|---|---|
| 2014/0200423 A1* | 7/2014 | Eisen | ............... | A61B 5/7278 600/340 |
| 2017/0367659 A1* | 12/2017 | Lading | ............... | A61B 5/021 |
| 2019/0282107 A1* | 9/2019 | Gelissen | ............... | A61B 5/6843 |

* cited by examiner

*Primary Examiner* — Jason M Ip
(74) *Attorney, Agent, or Firm* — Kilpatrick Townsend & Stockton LLP

(57) ABSTRACT

Techniques are described for non-invasive, dual-altitude-based measurement of blood pressure of a user using a portable electronic device having a sensor head. Illumination is projected into a body part and received by photodetectors. A changing amount of illumination received by the photodetectors changes corresponds to a changing amount of blood volume in elastic circulatory system pathways in the body part. Measurements of the received illumination are obtained at multiple altitudes relative to the user's heart. A linear fit is applied to the multiple measurements based on at least a predetermined slope-calibration factor to obtain a slope-corrected mean blood pressure measurement (BPM). Some embodiments use similar techniques to further measure pulse-to-mean (PTM) at multiple altitudes. The PTM measurements are used to simulate a systolic and/or diastolic BPM.

19 Claims, 10 Drawing Sheets

DUAL-ALTITUDE-BASED NON-INVASIVE BLOOD PRESSURE MONITORING

TECHNICAL FIELD

This disclosure relates to portable medical monitoring devices, and, more particularly, to portable electronic devices and techniques for dual-altitude-based non-invasive blood pressure monitoring.

BACKGROUND

Portable electronic devices with various types of sensors have become ubiquitous. People commonly walk around with smartphones and wearable devices (e.g., fitness trackers, smart watches, etc.) that periodically and/or continuously detect and record sensor data about the person and/or the person's environment. Many such sensors help monitor changes in physical and/or mental state of a user, such as for fitness tracking, biofeedback, etc. For example, many modern smart watches have sensors to monitor a wearer's body temperature (e.g., using a thermocouple), heart rate or pulse (e.g., using optical or ultrasonic reflection), number of steps (e.g., using a pedometer), etc. However, conventional portable electronic devices and techniques have not tended to be able to provide accurate blood pressure measurements.

SUMMARY

Embodiments provide systems and methods for non-invasive, dual-altitude-based measurement of blood pressure of a user using a portable electronic device. Illumination is projected through a body part and received by photodetectors on the other side of the body part. The body part includes elastic pathways of the circulatory system through which blood flows. Cycles of contraction and relaxation by the heart cause pulse waves to travel through the blood, which cause volumetric changes in the elastic pathways. The transient changes in blood volume result in corresponding transient changes in the amount of illumination that is absorbed by the body part versus the amount that passes through to the photodetectors, as manifest by a detection output signal relating to an intensity of detected illumination that was not absorbed by the blood volume.

As described herein, one or more first detection output signals are obtained with the device (i.e., at least the sensors) in a first position relative to the user's heart, and one or more second detection output signals are obtained with the device in a second position relative to the user's heart. Except for the effective altitude difference between the first and second positions, factors affecting blood pressure measurement are controlled so that any difference between the first and second detection output signals primarily results from different gravitational effects on the blood flow in the different relative positions. One or more mean blood pressure measurements can be computed based on a linear fitting (e.g., slope fitting) applied to the difference in detection output signals and one or more previously computed calibration factors. In some embodiments, multiple pulse to mean (PTM) and mean blood pressure measurements are computed in the multiple relative positions and can be used to estimate systolic and diastolic blood pressure measurements.

BRIEF DESCRIPTION OF THE DRAWINGS

The accompanying drawings, referred to herein and constituting a part hereof, illustrate embodiments of the disclosure. The drawings together with the description serve to explain the principles of the invention.

Figure 1:
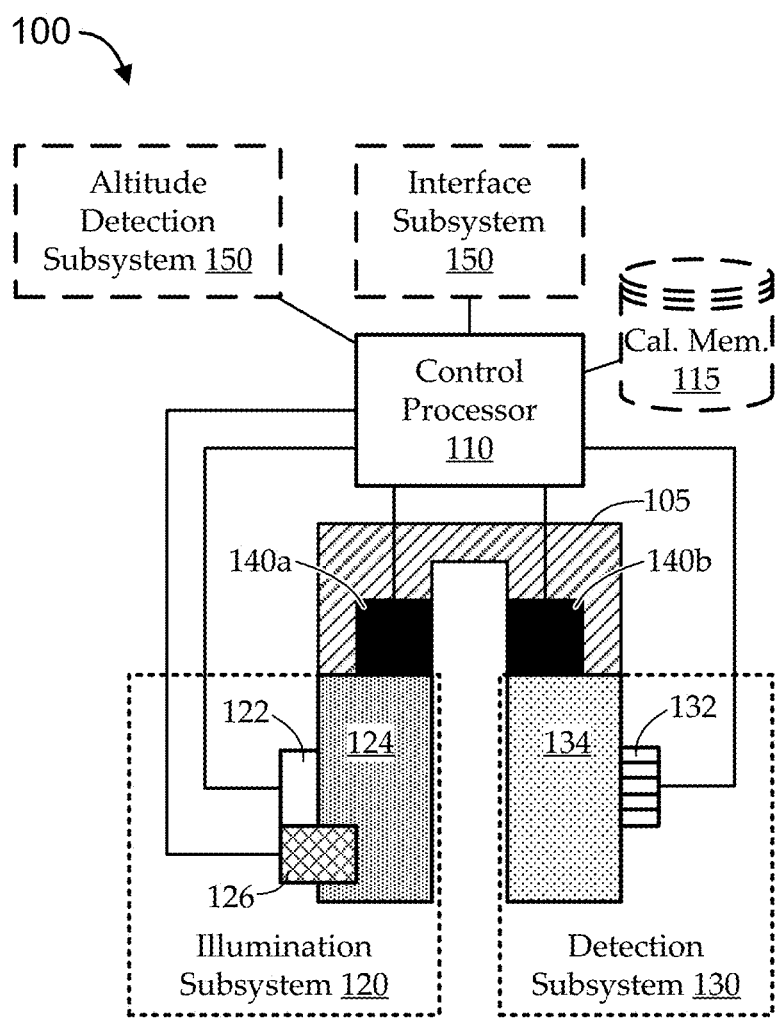
FIG. 1 shows a block diagram of a portable electronic device, according to various embodiments described herein.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It has become commonplace for individuals to use smartphones, smart watches, and/or other portable (e.g., wearable) electronic devices to obtain vital signs and related measurements. For example, many conventional wearable fitness trackers record a wearer's body temperature, heart rate, etc. to help the user monitor general health conditions, exercise, sleep, ad/or the like. While it can also be desirable to monitor blood pressure, conventional portable electronic devices and related techniques have not tended to be able to accurately measure blood pressure.

Conventionally, non-invasive blood pressure measurement is performed using a sphygmomanometer, which includes an inflatable blood pressure cuff connected to a inflation pump and a pressure gauge. The cuff is evenly tightened around the upper arm of a person, and a stethoscope disk is placed on the inner side of the upper arm under the cuff. The cuff is then pumped up rapidly until the gauge on the cuff shows a high reading (e.g., considerably higher than the person's typical systolic blood pressure), indicating blood flow has been occluded in the region of the cuff. Air is slowly let out of the cuff until a heart sound is first heard in the stethoscope, at which point the gauge reading is recorded as the person's systolic blood pressure. Air continues to be let out until the heart sounds are no longer heard through the stethoscope, at which point the gauge reading is recorded as the person's diastolic blood pressure. At any particular measurement location in a body (e.g., at the upper arm), the measured blood pressure can relate to the heart pump strength, the blood flow resistance, and the altitude and gravity difference between the measurement location and the heart. For example, when the heart is relaxed, blood flows relatively slowly throughout the body at relatively low pressure; when the heart contracts, a resulting pressure wave quickly travels through the blood throughout the circulatory system. In the conventional cuff-based approach to blood pressure measurement, the chosen measurement location has a relatively large amount of blood flow and is generally close to the same altitude (and gravity) as the heart. The systolic blood pressure then indicates the maximum pressure of the pressure wave in the blood stream caused by the contraction of the heart (i.e., during a systole), and the diastolic blood pressure indicates the minimum pressure while the heart is relaxing and refilling with blood (i.e., during a diastole).

While cuff-based blood pressure measurement procedures can tend to provide accurate measurements of both systolic and diastolic blood pressure, they tend to have various limitations. One limitation of such a cuff-based procedure is the reliance on various pieces of specialized equipment, including a sphygmomanometer and a stethoscope, which tend to be large, bulky, expensive, and not readily available to most individuals. Another limitation of such a cuff-based procedure is the reliance on active manual engagement with the measurement equipment by one or more individuals. Another limitation of such a cuff-based procedure is that obtaining accurate measurements tends to involve spending sufficient time and having sufficient focus to slowly release pressure in the cuff, listen for heart sounds, and accurately record systolic and diastolic readings. Another limitation of such a cuff-based procedure is that individuals with limited coordination, dexterity, hearing, etc. may be unable to perform such procedures.

Another conventional non-invasive approach to blood pressure measurement is based on previously studied and calibrated relationships between blood pressure and pulse transit time (PTT). PTT-based approaches have been thoroughly tested and used over at least the past decade, but such approaches also have various limitations. One such limitation is that PTT-based approaches typically rely on concurrent collection of data from at least two different sensors in two locations on a person's body, such as by placing an electrocardiogram (ECG) sensor at a person's heart and a pulse detector at a peripheral location (e.g., a fingertip). A related limitation is that obtaining a blood pressure measurement can then involve concurrently monitoring, synchronizing (e.g., including accurate peak detection), analyzing, and/or otherwise processing the signals from both sensors.

In an attempt to use more portable and accessible types of measurement devices, some PPT-based and other types of non-invasive blood pressure measurement approaches have sought to use so-called photoplethysmography (PPG). PPG-based approaches typically involve placing a light source (e.g., an infrared light-emitting diode) and light detector on a same side of a fingertip, or other body part. Materials in the blood (e.g., hemoglobin) tend to absorb certain wavelengths of light that do not tend to be absorbed (or not to the same degree) by surrounding tissue. Exploiting that concept, light from the light source is projected into the fingertip; portions of light tend to be absorbed, transmitted, or reflected as it interacts with blood and other biological features; and reflected portions of the light are detected by the light detector to produce a received reflection signal. The received reflection signal is recorded over time (e.g., over one to two minutes) to generate a heartbeat signal profile that indicates a pulse.

Technically, a pulse rate is a rate of increases (pulses) in palpable blood pressure throughout the body, which synchronizes and correlates to heart rate in a healthy individual. As such, while pulse measurements relate to the timing of changes in blood pressure, the pulse measurement do not provide a measure of the blood pressure itself (i.e., the systolic and/or diastolic blood pressure measurements). Indeed, PPG-based techniques have been successfully used in various contexts as pulse sensors (e.g., in smart watches, etc.), but such techniques have not tended to be able to provide accurate blood pressure measurements for a number of reasons. One reason is that the light path in PPG implementations, from the light source to the light detector, tends to intersect with different networks of arteries, vessels, capillaries, etc., such that the received reflection signal can tend to be a noisy signal, and slight changes in location of the light source and/or light sensor can result in different signal information. Another reason is that, even in laboratory-based, or other carefully controlled PPG implementations that yield relatively clean heartbeat signal profiles (i.e., received reflection signals) with relatively clear systolic peaks, the diastolic peaks (or troughs) can be difficult to accurately detect. For example, the diastolic blood flow can be relatively slow-moving and low-pressure, which can make it difficult to obtain useful measurement data, especially in regions with relatively small blood volume, such as in a fingertip. As such, even if peak-to-peak measurements between the systolic peaks can yield useful heart rate or pulse information, there typically remains insufficient data for accurate blood pressure measurements.

Another reason is that PPG-based implementations typically cannot account for certain factors, such as pressure on the blood flow caused by the PPG-based measurement device itself, and/or location of the body part relative to the heart, which can have appreciable impacts on characteristics of the received reflection signal. Any pressure magnitude information obtained by PPG-based devices can be appreciably impacted by the selection of measurement location, the amount of pressure being exerted on the measurement location by the device itself (e.g., if the device is clamped onto the fingertip, or in a watch with a watchband cinched around a wrist), and/or other factors.

Embodiments described herein include techniques for non-invasive, dual-altitude-based measurement of blood pressure of a user using a portable electronic device having a sensor head. Illumination is projected into a body part and received by photodetectors. A changing amount of illumination received by the photodetectors changes corresponds to a changing amount of blood volume in elastic circulatory system pathways in the body part. Measurements of the received illumination are obtained at multiple altitudes relative to the user's heart. A linear fit is applied to the multiple measurements based on at least a predetermined slope-calibration factor to obtain a slope-corrected mean blood pressure measurement (BPM). Some embodiments use similar techniques to further measure pulse-to-mean (PTM) at multiple altitudes. The PTM measurements are used to simulate a systolic and/or diastolic BPM.

Turning to FIG. 1, a block diagram is shown of a portable electronic device 100, according to various embodiments described herein. The portable electronic device 100 is an implementation of a system for non-invasive, dual-altitude-based measurement of blood pressure of a user. As described above, a contraction of the heart muscles (during a systole) causes a pressure wave to travel through the blood throughout the various elastic blood circulatory pathways of the circulatory system, such as in arteries, veins, capillaries, etc. The magnitude of pressure of the pressure wave can be different at different check points in the circulatory system (i.e., corresponding to different body parts) based on the sizes and types of elastic blood circulatory pathways in that check point, the location of the check point relative to the heart, restrictions on blood flow to that check point, etc.

Thus, embodiments of the portable electronic device 100 are configured to be placed and/or held in contact with one or more body parts of the user that include at least one such elastic blood circulatory pathway through which flows a continuously changing volume of blood. In general, it can be preferable to select the body part to have good (e.g., relatively uniform) distribution of elastic circulatory pathways, while minimizing presence of tissues other than those elastic circulatory pathways. It can also be preferable for the design of the portable electronic device 100 to facilitate easy placement of the sensor components on body part locations that can be moved to different height positions in a relatively simple and repeatable manner. Various example configurations are described in more detail below.

During a calibration routine, such placement of the portable electronic device 100 permits calibration of the portable electronic device 100 to the body part, the user, etc. During a measurement routine, such placement permits obtaining of blood pressure measurements based on optically detecting the changing volume of blood in the body part and based on the calibration. As described more fully below, embodiments use a novel dual-altitude approach to obtain a reliable blood pressure measurement (BPM). In general, such a dual-altitude approach involves obtaining measurements at two or more altitudes relative to the user's heart, such that the effect of gravity on the blood flow in the body part manifests a clearly detectable difference at the two altitudes. The minimum difference between the two or more altitudes can depend on the sensitivity of the measurement sensors. However, the inventors have experimentally demonstrated that a difference of several hundred millimeters can manifest sufficient change in gravitational effect to be easily detected by consumer-grade optical detection techniques.

For example, some implementations are described herein as configuring the portable housing 105 of the portable electronic device 100 to be slid over, clamped onto, strapped to, or otherwise placed on a fingertip, wrist, or forearm. In such a configuration, the user can easily establish two altitudes that are easy to repeat within an acceptable tolerance of accuracy.

Figure 2:
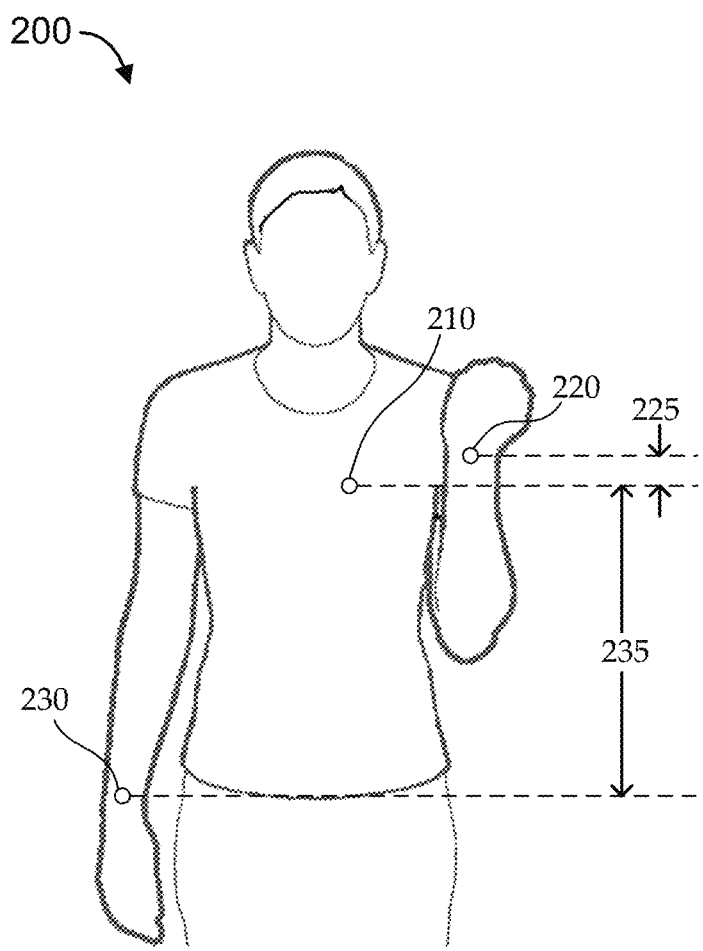
FIG. 2 shows an image of a person having each arm in different positions that can correspond to two repeatable altitudes.

As an illustrative example, FIG. 2 shows an image of a person having each arm in different positions that can correspond to two repeatable altitudes. As illustrated, the user's right arm is hanging to the side of the user's torso with the elbow fully extended. The user's left arm side is positioned so that an upper part of the arm is hanging to the side of the user's torso, but the user's elbow is fully bent upwards. It can be assumed that the user is wearing the electronic device 100 (at least the sensor portions) at the wrist. If the user were wearing the electronic device 100 on the left wrist (with the arm in the bent-elbow position), at least the sensor portion of the electronic device 100 would be positioned at a first altitude 220 close to a heart altitude 210 (above the heart by some first vertical distance 225). If the user were wearing the electronic device 100 on the right wrist (with the arm in the extended-elbow position), at least the sensor portion of the electronic device 100 would be positioned at a second altitude 230 well below the heart altitude 210 (below the heart by some second vertical distance 235). In this way, by wearing the portable housing 105 in a substantially consistent location (e.g., on the wrist), a user can easily position the portable housing 105 at two different altitudes that are highly repeatable (relative to the accuracy of the measurement technique) and are separated by a total vertical distance (i.e., the sum of the first vertical distance 225 and the second vertical distance 235) of hundreds of millimeters (e.g., approximately 500 millimeters), depending on the arm length of the user and/or other factors.

Returning to FIG. 1, as illustrated, the portable electronic device 100 includes a control processor 110, an illumination subsystem 120, an optical detection subsystem 130, and the portable (e.g., wearable) housing 105. Some implementations include additional components, such as one or more of a contact force subsystem 140, an interface subsystem 150, an altitude detection subsystem 160, and/or a calibration memory 115. In some implementations, at least the illumination subsystem 120 and the optical detection subsystem 130 are referred to as a "sensor head." The sensor head can optionally include one or more of the other components, such as the contact force subsystem 140. In embodiments that include the altitude detection subsystem 160, such a subsystem can include any suitable components for measuring altitude to within a sufficient resolution (e.g., tens of millimeters). For example, such a subsystem can include gravity sensors, etc.

Embodiments can be implemented with one or more housing structures that comprise the housing 105, such as described more fully below. In some implementations, all components of the electronic device 100 can be housed in a single housing 105 that can be portable, wearable, etc. In other implementations, one structure of the housing 105 includes the sensor head components, and another structure of the housing 105 includes other components (e.g., the control processor 110, interface subsystem 150, etc. When the housing 105 is implemented as multiple separate structures, the structures can integrate additional components to facilitate communications between them. For example, components in separate structures can communicate via wires and/or wireless communications. When the housing 105 is implemented with multiple structures, the structures may or may not also be in structural communication (e.g., coupled via additional structures).

During use, the portable electronic device 100 (at least the sensor head components) is secured against (e.g., held against, strapped to, secured around, etc.) a body part with some amount of contact force. The body part includes at least one elastic blood circulatory pathway through which flows a continuously changing volume of blood, as described above. Such securing of the device 100 against the body part positions the illumination subsystem 120 to project illumination into the body part positions the optical detection subsystem 130 to receive portions of the illumination not absorbed by the blood volume and/or other structures of the body part. The illumination subsystem 120 projects illumination through the body part at an optical frequency that is absorbed by blood. Illumination characteristics can be different depending on the type of optical illuminators and detectors being used, characteristics of the body part (e.g., tissue thickness), etc. In some implementations, probe wavelength is selected to be substantially transparent to lipid and protein materials so that the sensing is appreciably impacted by soft tissues. As one example, various species of hemoglobin in blood tend to absorb light very well at wavelengths between around 550-600 nm. As another example, red light (e.g., in the 620-750 nm wavelength range), or near infrared light (e.g., in the 850-1050 nm wavelength range) is used.

Embodiments of the illumination subsystem 120 can include a set of (i.e., one or more) illumination sources 122, and embodiments of the optical detection subsystem 130 can include a set of (i.e., one or more) photodetectors 132. For example, the set of illumination sources 122 includes one or more light-emitting diodes (LEDs) that output the illumination at one or more optical frequencies absorbed by blood. The set of photodetectors 132 includes any suitable optical detectors to detect the illumination output by the set of illumination sources 122. In some configurations, one or more illumination sources 122 and one or more photodetectors 132 are on a same side of the body part, so that the photodetectors 132 receive reflected illumination. In some configurations, one or more illumination sources 122 and one or more photodetectors 132 are on opposite sides of the body part, so that the photodetectors 132 receive illumination that passed fully through the body part. Some embodiments position the illumination sources 122 and photodetectors 132 to cover a large enough portion of the body part to avoid or minimize impacts to optical detection from moles, shallow blood vessels, scars, hairs, etc.

Some embodiments of the illumination subsystem 120 further include an illumination spreader 124 to increase a uniformity of illumination distribution from the set of illumination sources 122 over an illumination region of the body part. In some implementations, the illumination spreader 124 includes a diffuser material. For example, the set of illumination sources 122 are point sources of illumination, and the diffuser material of the illumination spreader 124 spreads the point-source illumination into a diffuse illumination of the illumination region of the body part. In some such implementations, the diffuser material is a diffuser film, such as a transparent material film having microprisms, or other shapes patterned thereon, which tend to cause diffusion of light projected through the film. In other such implementations, the diffuser material includes waveguide elements, which effectively convert a small number of input illumination sources 122 into a larger number of output illumination sources that can be further spread out over the illumination region. In other implementations, the illumination spreader 124 includes an air gap over the illumination region of the body part, and the illumination sources 122 are configured to project illumination in a manner that generally diffuses over the air gap. For example, such an illumination spreader 124 can include one or more spacing structures that holds the illumination sources 122 some distance away from the illumination region of the body part. In some such implementations, the air gap can be surrounded by reflective material, or the like, so that illumination projected into the air gap tends to be reflected and multiplied around the air gap to diffusely fill the air gap with illumination. Embodiments of the illumination subsystem 120 can also include optical shielding components to mitigate impacts of ambient light on optical measurements. For example, the illumination spreader 124 can include an opaque frame.

Various embodiments of the illumination subsystem 120 can be optimized for certain features. For example, illumination sources 122 can be configured to project a probe beam of illumination so that blood can absorb a desired ratio of the probe beam energy, while other proximate tissues (bones, fat, nerves etc.) absorb little or none of the probe beam energy. The arrangement of illumination sources 122 and/or the illumination spreader 124 can be configured so that the illumination region is expanded to cover enough quantity of blood vessels and/or other elastic circulatory pathways. The illumination sources 122, illumination spreader 124, and or other components can be modulated to mitigate, or even eliminate environmental influences, such as ambient light. The illumination sources 122 and/or other active components can be designed for low power consumption.

Some embodiments of the illumination subsystem 120 include an illumination monitor 126 to monitor illumination output of the set of illumination sources 122. For example, the illumination monitor 126 can detect whether one of the set of illumination sources 122 is failing, or otherwise no longer projecting illumination; whether there is an appreciable change in brightness, color, or stability of the illumination; etc. In some implementations, the illumination monitor 126 includes one or more photo-sensors to directly monitor characteristics of the illumination being output by the illumination sources 122. For example, one or more of the photodetectors 132 of the optical detection subsystem 130 can be configured (e.g., positioned, coupled with circuitry, etc.) to operate as the illumination monitor 126 for one or more of the illumination sources 122. For example, in the optical detection subsystem 130, some photodetectors 132 are positioned and configured to obtain an illumination intensity measurement that can be used to normalize the detection output signals produced by others of the photodetectors 132. In other implementations, the illumination monitor 126 indirectly monitors the illumination output of the illumination sources 122, such as by monitoring driving current through the illumination sources 122, and/or other electrical characteristics. For example, embodiments of the portable electronic device 100 can include a portable power source (e.g., a rechargeable battery) to drive the illumination subsystem 120, and a failure, low voltage condition, or the like can negatively impact illumination output of the illumination sources 122. Embodiments of the illumination monitor 126 can output one or more signals to indicate a present condition of the illumination output. Such an approach can help to maintain consistency across measurements, over time, etc. and/or to maintain calibration of illumination subsystem 120 and optical detection subsystem 130 components.

The illumination subsystem 120 and the optical detection subsystem 130 can be placed on the same side, or on either side of a body part during use. In either configuration, the illumination subsystem 120 projects illumination into the body part, and the optical detection subsystem 130 receives portions of that illumination after any absorption, scattering, etc. by anatomical features. In general, it can be assumed that the anatomical features of the body part stay relatively constant over a short measurement timeframe, except for dynamic changes in blood volume (and corresponding changes in elastic blood pathways). As such, the optical detection subsystem 130 can generate one or more detection output signals based on an intensity of the received illumination, and it can be assumed that a magnitude of the detection output signals manifests an inverse relationship to blood volume at any particular time and that the changes in the magnitude of the detection output signals corresponds to dynamic changes in the blood volume.

Embodiments of the optical detection subsystem 130 can include a set of photodetectors 132 to generate the detection output signal in response to exposure to the received portions of the illumination. In some implementations, the set of photodetectors 132 is implemented as one or more distinct photodiodes, or other suitable photosensor components. In some implementations, the set of photodetectors 132 is implemented as an array of detection pixels, as a charge-coupled device (CCD) array, or any other suitable configuration of photodetectors 132. Some implementations of the set of photodetectors 132 include readout circuitry to facilitate generation of the detection output signal. For example, the readout circuitry can include filters, amplifiers, analog-to-digital converters, and/or other suitable circuitry. In some embodiments, the optical detection subsystem 130 also includes a receiving aperture 134 to direct the received portions of the illumination onto the set of photodetectors 132. The receiving aperture 134 can include any suitable components to facilitate receipt of the portions of the illumination as incident illumination on the photodetectors 132. For example, the receiving aperture 134 can include lenses, shutters, filters, light-guides, etc. Some embodiments implement the optical detection subsystem 130 as an imaging system, such as a video imaging system having integrated optics, photodetector 132 array, supporting circuitry, etc.

Embodiments of the control processor 110 are in communication with at least the optical detection subsystem 130 to generate one or more blood pressure output signals as described herein. Embodiments of the control processor 110 can include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC) processor, a complex instruction set computer (CISC) processor, a microprocessor, or the like, or any combination thereof. The control processor 110 can be in communication with a memory (e.g., the calibration memory 115 described below, instruction memory, etc.), which can include at least non-transient storage for providing processor-readable instructions to the control processor 110 and for storing various types of data to support features described herein. In some embodiments, such memory is all local storage (e.g., one or more solid-state drives, hard disk drives, registers, etc.) of the portable electronic device 100. Additionally or alternatively, embodiments of such a memory can include remote storage (e.g., a remote server), distributed storage (e.g., cloud-based storage), or other non-local storage.

In some embodiments, the optical detection subsystem 130 outputs the detection signal to the control processor 110 as a digital signal. In other embodiments, the optical detection subsystem 130 outputs the detection signal to the control processor 110 as an analog signal, and the control processor 110 includes an analog-to-digital conversion stage. In general, it can be expected that pumping of the heart will generate substantially periodic pulse waves in the blood flowing through the arteries, or other elastic circulatory pathways of the body part. Movement of the pulse waves through the circularity pathways of the body part will correspondingly cause substantially periodic increases and decreases in blood volume relating to the magnitude of pressure change during the presence and absence of the pulse wave. This blood volume change will correspondingly cause substantially periodic increases and decreases in the amount of projected illumination being absorbed by the local blood volume, thereby correspondingly causing substantially periodic decreases and increases in the amount of illumination that passes through to the optical detection subsystem 130 without absorption or reflection.

Figure 3:
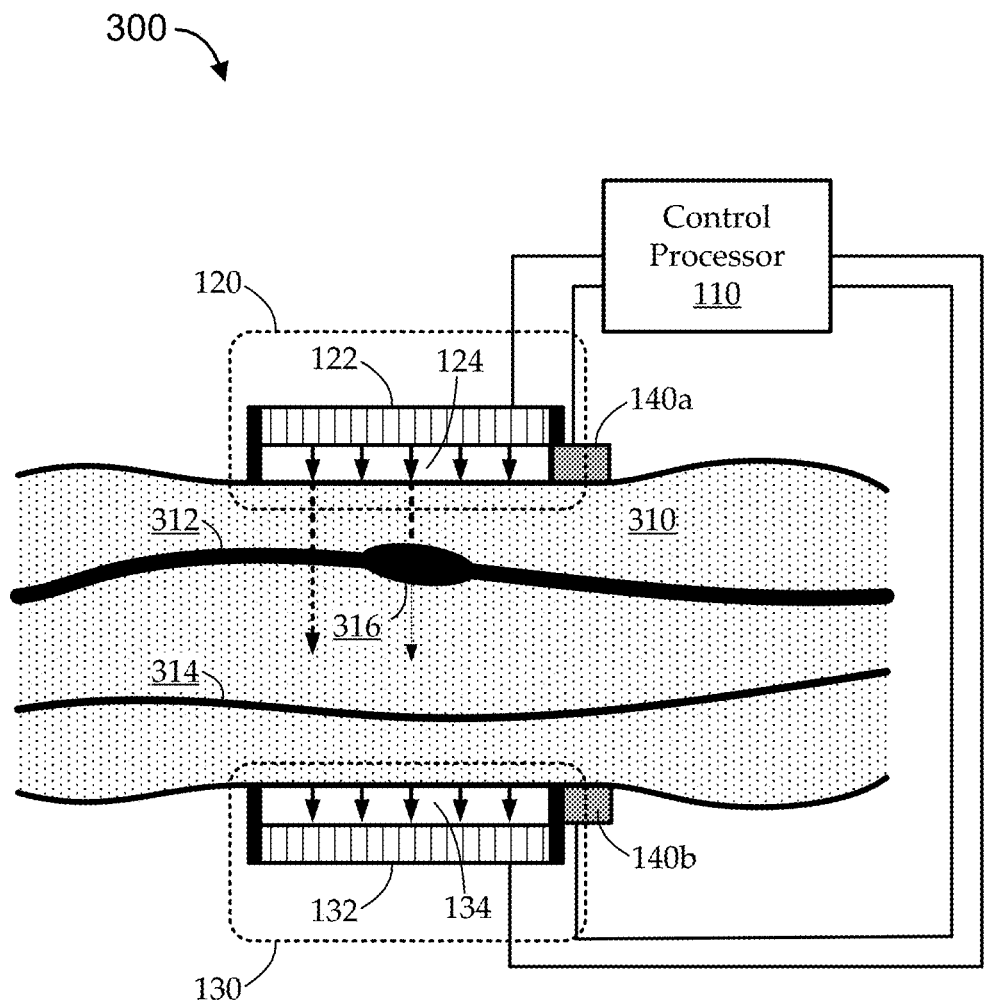
FIG. 3 shows an example blood pressure measurement environment including components of an illustrative portable electronic device.

For the sake of illustration, FIG. 3 shows an example blood pressure measurement environment 300 including components of an illustrative portable electronic device 100. As illustrated, during use, a set of illumination sources 122 of an illumination subsystem 120 is shown generally projecting light into the body part 310 to cover a skin area. For example, the multiple illumination sources 122 can be spread over the skin area, or the illumination sources 122 can project through an air gap, wave guides, or another suitable illumination spreader 124. While the illumination is illustrated as traveling along arrows, some implementations use illumination sources and/or an illumination spreader 124 that projects the illumination at multiple angles, more diffusely, etc.

Portions of the illumination can be absorbed (e.g., by blood flowing the body part 310), scattered, and/or reflected, and another portion of the illumination "passes through" the body part and reaches the optical detection subsystem 130. The phrase "passes through" is used herein to describe portions of the illumination that are able to reach the optical detection subsystem 130, as distinguished from those portions of the illumination that cannot reach the optical detection subsystem 130 (e.g., those portions that are absorbed by the blood in the body part 310, scattered away from the optical detection subsystem 130, etc.). In some configurations (e.g., as illustrated), the illumination subsystem 120 and the optical detection subsystem 130 are on opposite sides of the body part 310, such that the detected illumination is illumination that "passed through" the body part 310 by passing fully through from one side of the body part 310 to an opposite side of the body part 310 (e.g., on either side of a finger). In other configurations, the illumination subsystem 120 and the optical detection subsystem 130 are on a same side of the body part 310, such that the detected illumination is illumination that "passed through" the body part 310 by passing from the illumination sources 122 into a first location on the body part 310, reflecting (e.g., and/or scattering) within the body part 310, and subsequently exiting a second location of the body part 310 into the photodetectors 132 of the optical detection subsystem 130. The optical detection subsystem 130 can include any suitable photodetectors 132, optical components (e.g., apertures, air gaps, lenses, etc.), and circuitry (e.g., readout circuitry).

The body part 310 includes various elastic circulatory system pathways, such as arteries 312, veins 314, etc. As describe above, it can be expected that pumping of the heart will generate substantially periodic pulse waves in the blood flowing through the elastic circulatory pathways, which will cause corresponding periodic changes in blood volume. An exaggerated and simplified example of a transient change in blood volume resulting from a traveling pulse wave in the blood stream is illustrated by reference 316. In fact, the body quickly and efficiently adapts to such changes in blood volume and pressure, such that the transient changes may be practically undetectable (or too small to provide any reliable measurement data) in most elastic pathways of the circulatory system other than main arteries (e.g., the volume change is shown only in the artery 312 in FIG. 3). It can be seen that portions of the illumination passing through regions of lower blood volume are less attenuated (i.e., less absorbed) than portions of the illumination passing through regions of higher blood volume. As such, changes in the level of illumination as received by the optical detection subsystem 130 can correspond to changes in the blood volume caused by the passing pulse wave.

Figure 4:
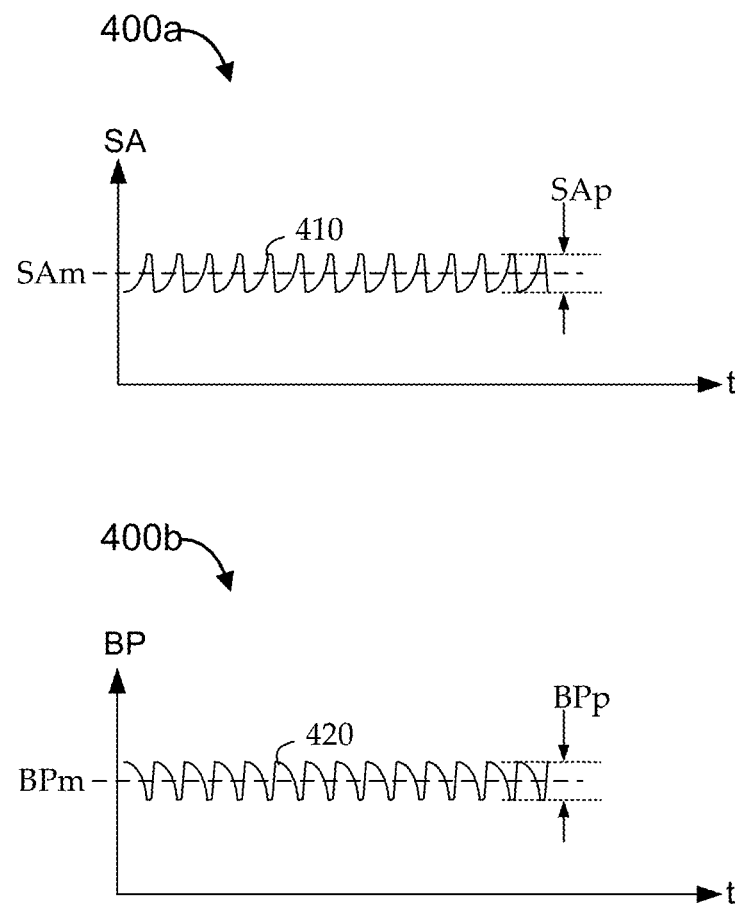
FIG. 4 shows simplified plots of an illustrative detection output signal corresponding to an illustrative blood pressure plot resulting from constantly changing blood volume in an elastic blood pathway.

For further clarity, FIG. 4 shows simplified plots 400 of an illustrative detection output signal 410 corresponding to an illustrative blood pressure plot 420 resulting from constantly changing blood volume in an elastic blood pathway. The detection output signal 410 illustrates a measured detection signal output magnitude (SA) over time, and the blood pressure plot 420 illustrates a derived blood pressure magnitude (BP) over time. Both the detection output signal 410 and the blood pressure plot 420 are illustrated as simplified periodic signals.

Each time a pressure wave passes through the elastic circulatory pathways of the body part, there are corresponding, generally periodic increases and decreases in blood volume in those pathways. As shown in plot 400*b*, each pressure wave ultimately manifests as a pulse in the blood pressure plot 420, such that the blood pressure plot 420 shows a peak-to-peak amplitude (BPp) and a mean blood pressure (BPm) over time. The generally periodic changes in blood volume cause corresponding periodic decreases and increases in the amount of illumination reaching the optical detection subsystem 130, which manifests as generally periodic decreases and increases in SA in the detection output signal 410. In particular, each pressure wave manifests as a pulse in the detection output signal 410 having a peak-to-peak amplitude (SAp). Over time, the pulses of the detection output signal 410 also manifest a mean signal amplitude (SAm). The blood pressure plot 420 and the detection output signal 410 have the same period, so that the period can also provide an indication of pulse (heart rate).

The control processor 110 can generate a BPM output signal based on the detection output signal 410. As noted above, SA corresponds directly to blood volume changes as manifest by received illumination levels, but SA does not directly correspond to blood pressure measurements (i.e., there is no single scalar mapping between any particular value of SA, or series of values of SA, and a particular BPM). Instead, the control processor 110 uses the novel dual-altitude approach described herein, along with one or more calibration factors, to convert multiple SA signal measurements from the detection output signal 410 into at least one blood pressure measurement (BPM). As described herein, some embodiments use only the SAm at different altitudes to derive a slope-corrected mean blood pressure measurement (BPM). Some embodiments described herein also use pulse to mean (PTM) information, which corresponds to a ratio between the SAp and the SAm, to derive simulated systolic and simulated diastolic BPMs.

Returning to FIG. 1, as described above, the illumination subsystem 120 projects illumination through a body part that includes at least one elastic blood circulatory pathway through which flows a continuously changing volume of blood; and the optical detection subsystem 130 generates a detection output signal based on detecting changing amounts of received portions of the illumination passing through the body part corresponding to the continuously changing volume of blood. The control processor 110 receives the detection output signal and generates a blood pressure measurement (BPM) output according to the dual-altitude-based approach.

In a first measurement time window, the body part is held positioned at a first altitude relative to the user's heart. In particular, the body part is held in a manner that positions at least the sensor head components at the first altitude. For example, the user is directed (e.g., via the interface subsystem 150) to stand with the arm hanging and the elbow bent completely upward. The control processor 110 directs the illumination subsystem 120 to project the illumination through the body part and directs the optical detection subsystem 130 to generate the detection output signal based on the received portions of the illumination passing through the body part. The control processor 110 can then compute a first mean intensity of the detection output signal over the first measurement time window.

In a second measurement time window, the user is directed to reposition the body part (and correspondingly, to reposition the sensor head components) at a second altitude relative to the user's heart. For example, the user is directed (e.g., via the interface subsystem 150) to remain standing with the arm hanging, but now to extend the elbow so that the entire arm is hanging next to the user's body. The same measurements are repeated in this second-altitude position. Again, the control processor 110 directs the illumination subsystem 120 to project the illumination through the body part and directs the optical detection subsystem 130 to generate the detection output signal based on the received portions of the illumination passing through the body part. The control processor 110 can then compute a second mean intensity of the detection output signal over the second measurement time window. For example, each of the first mean intensity and the second mean intensity can be represented by SAm of FIG. 4 as measured with the sensor head components in the two different altitudes.

The dual-altitude-based approach assumes that the measurement conditions in the first and second measurement time windows are substantially identical (e.g., similar enough not to have a measurable impact given the sensitivity of the sensor head components, and/or within a predetermined tolerance of the electronic device 100), except for changes in gravitational effect on the blood flow due to the difference in altitude between the measurement time windows. Given that assumption, the control processor 110 can compute the BPM output to indicate a slope-calibrated mean BPM as a function of the first mean intensity, the second mean intensity, and a slope-calibration factor.

The slope-calibration factor is determined during a calibration routine prior to the measurement routine (i.e., at least the first and second measurement time windows) described above. In some embodiments, the control processor 110 can include, or be in communication with, a calibration memory 115 to store the calibration data, including the slope-calibration factor. The calibration memory 115 can include any suitable type of memory, such as registers, solid state memory, etc., and the calibration data can be stored in any suitable manner.

The dual-altitude-based approach approximates a mean BPM based on linear fitting in accordance with the following mathematical relationship: $BP \cong S(I+Cr)$. In this relationship, "BP" represents an approximation of mean blood pressure, "S" represents a measured slope (i.e., a ratio of a difference in altitude to a difference in mean intensity of the measured signal), "I" represents a measured signal intensity, and "Cr" represents a slope-calibration factor. In some embodiments, Cr is a ratio of a wearing-position calibration (BPr) to a calibrated slope (Sr) (i.e., Cr=BPr/Sr). BPr can be pre-calibrated by the manufacturer, or otherwise predetermined based on the type of wearing condition. For example, BPr can be set to a particular value (e.g., as a factory-preset value, selected by a user via the interface subsystem 150, etc.) based on whether the sensor head components will be positioned on a wrist, a finger, etc.

During calibration, a calibration altitude difference can be obtained as a difference between some first calibration altitude (e.g., close to the height of the user's heart) and some second calibration altitude (e.g., below the user's heart, such as the position of the user's wrist with the arm fully hanging down). The calibration altitude difference can be measured by components of the electronic device 100 (e.g., by the altitude detection subsystem 160), or the altitude difference factor can be measured by the user (e.g., by a separate altitude detector, by a measuring tape, etc.) and input to the electronic device 100 (e.g., via the interface subsystem 150). In some embodiments, a gravitational adjustment factor is used to adjust the calibration altitude difference to an appropriate reference base (e.g., to millimeters of mercury, mmHg). For example, if the first calibration altitude is Hc1, the second calibration altitude is Hc2, and the gravitational adjustment factor is G, the calibration altitude difference can be computed as (Hc1−Hc2)/G.

The calibration routine can involve obtaining dual-altitude measurements in substantially the same manner as in the measurement routine described above. For example, in a first calibration time window, with the body part held positioned at a first calibration altitude relative to the user's heart, the control processor 110 directs the illumination subsystem 120 to project the illumination through the body part, directs the optical detection subsystem 130 to generate the detection output signal based on the received portions of the illumination passing through the body part, and computes a first calibration mean intensity of the detection output signal over the first calibration time window. In a second calibration time window, with the body part held positioned at a second calibration altitude relative to the user's heart, the control processor 110 directs the illumination subsystem 120 to project the illumination through the body part, directs the optical detection subsystem 130 to generate the detection output signal based on the received portions of the illumination passing through the body part, and computes a second calibration mean intensity of the detection output signal over the first calibration time window. The calibrated slope (Sr) can be computed as the ratio of the calibration altitude difference to the difference between the first and second calibration mean intensities.

In context of the optical detection, such as described with reference to FIG. 4, the signal intensity decreases with increases in blood volume in the body part. As an illustrative example, suppose the first mean calibration intensity (Ic1) is 580 (e.g., counts of an analog-to-digital conversion of the detection output signal) at the first calibration altitude (Hc1), the second mean calibration intensity (Ic2) is 500 at the second calibration altitude (Hc2), and there is 300 mm of vertical difference between the first and second calibration altitudes. Also, suppose G is 13.5. The calibrated slope (Sr) can be computed as:

$$S_r = \frac{\frac{Hc1 - Hc2}{G}}{Ic2 - Ic1} = \frac{\frac{300}{13.5} \text{mmHg}}{500 \text{ count} - 580 \text{ count}} = -0.278 \text{ mmHg/count}$$

Suppose further that BPr is 262.25 mmHg, such that the slope-calibration factor (Cr) is BPr/Sr=262.25/−0.278=−943.35 count. Applying the dual-altitude-based BPM relationship above, the user's mean BPM in the calibration condition (at the second calibration altitude) can be computed as BP≅S (I+Cr)≅−0.278 (500-943.35)≅123 mmHg. As noted above, the value of Cr can be maintained in the calibration memory 115.

Having performed the calibration routine, the user can subsequently obtain a blood pressure reading in accordance with the dual-altitude-based approach and at least the slope-calibration factor. In some implementations, it is assumed that the two measurement altitudes are the same as the calibration altitudes (or at least the difference between the measurement altitudes is within an accepted electronic device 100 tolerance with respect to the calibration altitudes). In such implementations, the calibration altitude difference (Hc1-Hc2/G) can be recorded as a calibrated altitude factor (Hr), and Hr can be stored in the calibration memory 115. For example, in the above example, Hr is 300/13.5=22.22. In other implementations, first and second measurement of altitudes are obtained, or an altitude difference is obtained (e.g., by manual measurement, by the altitude detection subsystem 160, etc.) in connection with the first and second measurement time windows.

Suppose that at some subsequent time, a new set of measurements is obtained. In a first measurement time window, the control processor 110 computes a first mean intensity (I1) of 595 counts; in a second measurement time window, the control processor 110 computes a second mean intensity (I2) of 505. The slope (S) can be computed as the ratio of the difference in measurement altitudes (adjusted by the gravitational adjustment factor) to the difference in measured mean intensities. As noted above, some implementations assume the adjusted difference in measurement altitudes to be the calibrated altitude difference, Hr. As such, S can be computed as Hr/(I2−I1)=22.22/−90=−0.247. Using Cr from the example above, the new mean BPM can be computed as BP≅S (I2+Cr)≅−0.247 (505-943.35)≅108 mmHg.

The above measurement routine results in a mean BPM. Some embodiments of the control processor 110 further generate the BPM output to include a simulated systolic BPM and/or a simulated diastolic BPM. The simulated systolic and/or diastolic BPMs can be generated based on pulse-to-mean (PTM) measurements. Each pulse wave of blood flow corresponds to a peak-to-peak change in the detection output signal, as illustrated by SAp in FIG. 4. Thus, the PTM of the blood pressure signal can be approximated as the ratio of SAp to SAm. As described above, a first mean intensity (e.g., SAm1) can be obtained during a first measurement time window. In some embodiments, a first intensity amplitude (e.g., SAp1) can also be obtained in the first measurement time window. Thus, the control processor 110 can compute a first PTM as PTM1=SAp1/SAm1.

Subsequently (e.g., in a third measurement time window between the first and second measurement time windows), the body part can be gradually moved below the first measurement altitude, while continually monitoring PTM. For example, the electronic device 100 is on the user's wrist and positioned substantially at the user's heart altitude in the first measurement time window, and the user is directed to slowly lower the arm. As the altitude of the sensor head components gradual decreases along with the gradual movement of the body part, the control processor 110 can continuously (e.g., repeatedly) compute PTM by repeatedly measuring the changing ratio between the changing SAp and SAm. At some point, the PTM will reach or cross a predefined systolic threshold level corresponding to a percentage of PTM1. For example, the inventors of the present disclosure has experimentally demonstrated that, when the changing PTM falls to approximately 90 percent of PTM1 (0.9*PTM1), the mean BPM at that position is a faithful approximation of the systolic BPM of the user.

In some embodiments, the body part can then be gradually raised (e.g., to an altitude above the first measurement altitude) while continuing to monitor PTM. For example, the user is directed to slowly raise the arm. As the altitude of the sensor head components gradual increases along with the gradual movement of the body part, the control processor 110 can continuously (e.g., repeatedly) compute PTM by repeatedly measuring the changing ratio between the changing SAp and SAm. At some point, the PTM will reach or cross a predefined diastolic threshold level corresponding to another percentage of PTM1. For example, the inventors of the present disclosure has experimentally demonstrated that, when the changing PTM increases to approximately 110 percent of PTM1 (1.1*PTM1), the mean BPM at that position is a faithful approximation of the diastolic BPM of the user.

It can be seen from the above description that the calibration routine can be performed in substantially the same manner as the measurement routines. As such, while some descriptions herein differentiate between calibration and measurement routines, some embodiments can be implemented without any such difference. For example, some embodiments have one or more factory-preset calibration factors (e.g., the slope-calibration factor) stored in calibration memory 115, and no calibration routine is performed. In such embodiments, altitude measurements are either obtained in each measurement routine (e.g., using the altitude detection subsystem 160), obtained by prompting the user to manually enter a measured altitude difference (e.g., via the interface subsystem 150), or in any other suitable manner.

Embodiments of the control processor 110 can be in communication with other components of the portable electronic device 100. For example, descriptions herein refer to the control processor 110 "directing" the illumination subsystem 120 to project illumination, or the like. Such descriptions intend to convey that the control processor 110 is configured to execute processor-executable instructions, generate control signals, communicate control signals, use feedback, and/or otherwise direct operation of other components.

Embodiments of the control processor 110 can also be in communication with a contact force subsystem 140. The pressure and volume of blood reaching a particular location in the circulatory system can be impacted by external restrictions to the blood flow. For example, when the portable housing 105 is clamped or pressed against the body part being used as the blood pressure check point, a holding force (e.g., clamping force, pressing force, constricting force, etc.) being exerted by the portable housing 105 on the body part can impact the measurement of blood pressure at that location. Some embodiments assume that the blood flow condition in the body part is kept substantially consistent over the measurement routine (e.g., over at least the first and second measurement time windows). The contact force subsystem 140 can be configured in any suitable manner to maintain a substantially stable contact force that supports to provide a substantially consistent blood flow condition.

In some embodiments, the contact force subsystem 140 includes passive structure to apply the stable contact force, such as a ring, belt, strap, etc. In some embodiments, the contact force subsystem 140 includes monitoring components to generate feedback indicating a present contact force. For example, the feedback can be generated in human-readable form, so that the user can manually adjust the passive structures to a desired contact force magnitude. In some embodiments the contact force subsystem 140 includes active structures (e.g., electromechanical structures) to dynamically adjust the contact force. For example, the contact force subsystem 140 can include an electromagnetically controllable spring force to apply contact force between the housing 105 and the body part. In some embodiments, the contact force subsystem 140 includes active structures in communication with feedback components to maintain a stable contact force between the housing 105 and the body part based on dynamic feedback control.

In some embodiments, the portable electronic device 100 further includes the interface subsystem 150. In some implementations, the interface subsystem 150 includes one or more wired and/or wireless ports by which to provide one or more wired and/or wireless communication interfaces between the portable electronic device 100 and an external system. For example, the interface subsystem 150 can include a one or more wired or wireless network interfaces, such as for communicating with wireless fidelity (WiFi), Bluetooth, ZigBee, cellular, satellite, Ethernet, cable, and/or any other suitable wired or wireless communication network; one or more peripheral interfaces, such as for interfacing with a headphone jack, a display port, etc.; etc. In other embodiments, the interface subsystem 150 includes an integrated human-readable display (e.g., one or more indicator LEDs, a touchscreen display, a LED display, a liquid crystal display (LCD), etc.) by which to visually provide human-discernable information to a user. In other embodiments, the interface subsystem 150 additionally or alternatively includes one or more audio transducers by which to provide human-discernable audio output. In various embodiments, the human-discernable information can include graphical output (e.g., alphanumeric, images, illumination of an indicator, etc.), audible output (e.g., synthesized sounds and/or speech, recorded sounds and/or speech, etc.), haptic output (e.g., vibration, etc.), etc. Some implementations additionally or alternatively generate machine-discernable information, such as for use by other computational devices to generate further analyses, provide human-discernable outputs, etc.

For example, as described above, embodiments of the control processor 110 compute a BPM output, which can include a mean BPM, a simulated systolic BPM, and/or a simulated diastolic BPM. Such BPM readings can be output in human-readable form (e.g., via a display), in computer-readable form (e.g., as digital data for storage and/or communication with another computational system), as haptic or audio feedback, etc. In some implementations, the interface subsystem 150 is used to prompt and/or guide the user. For example, the interface subsystem 150 can be used to guide the user to position the sensor head components at different altitudes to support the dual-altitude-based measurement approach.

In some embodiments, the interface subsystem 150 includes one or more input interfaces, such as to receive information from a user, from one or more peripheral devices, and/or from other computational systems. Such input interfaces can include one or more buttons, keypads, ports, touchscreen interfaces, etc. In some implementations, interface buttons can be used to selectively place the portable electronic device 100 into a measurement mode (for performing the measurement routine), or into a calibration mode (for performing the calibration routine). In some implementations, such input interfaces of the interface subsystem 150 are used to support receipt of data from the user, such as registration information, manually measured altitude data, etc. Some embodiments are configured to calibrate the slope-calibration factor and/or other information based on measurements received from a pre-calibrated blood pressure measurement device, such as a sphygmomanometer.

Some embodiments are configured to generate information other than BPM outputs. In some embodiments, the period of the detection output signal is used to derive a heart rate (pulse). In some embodiments, the illumination subsystem 120 is configured to provide multi-spectral illumination to the body part, which can be used to obtain various analyte measurements, blood oxygen measurements, etc. Any of these and/or other types of measurements can be output via the interface subsystem 150.

As described above, embodiments of the portable housing 105 can be configured to house some or all components of the portable electronic device 100. Some embodiments of the portable housing 105 are structurally configured to hold at least the sensor head components (at least the illumination subsystem 120 and the optical detection subsystem 130) against the body part with a stable holding force during the measurement routine. Some embodiments of the portable housing 105 are further configured to fully house the control processor 110 within the portable housing 105. Some embodiments of the portable housing 105 also have the pressure detection subsystem 140 integrated therein. Some embodiments of the portable housing 105 also have some or all of the interface subsystem 150 integrated therein, such as including one or more integrated displays, integrated buttons, integrated ports, etc.

The portable housing 105 can be implemented in many different ways to support the features described herein. For the sake of simplicity, two configurations of portable housing 105 are discussed with reference to the primary sensor head configuration: reflection-type configurations and transmission-type configurations. In general, the reflection-type configurations are implemented with the illumination subsystem 120 and the optical detection subsystem 130 on the same side of a body part, while the transmission-type configurations are implemented with the illumination subsystem 120 and the optical detection subsystem 130 on opposite sides of the body part.

Figure 5A:
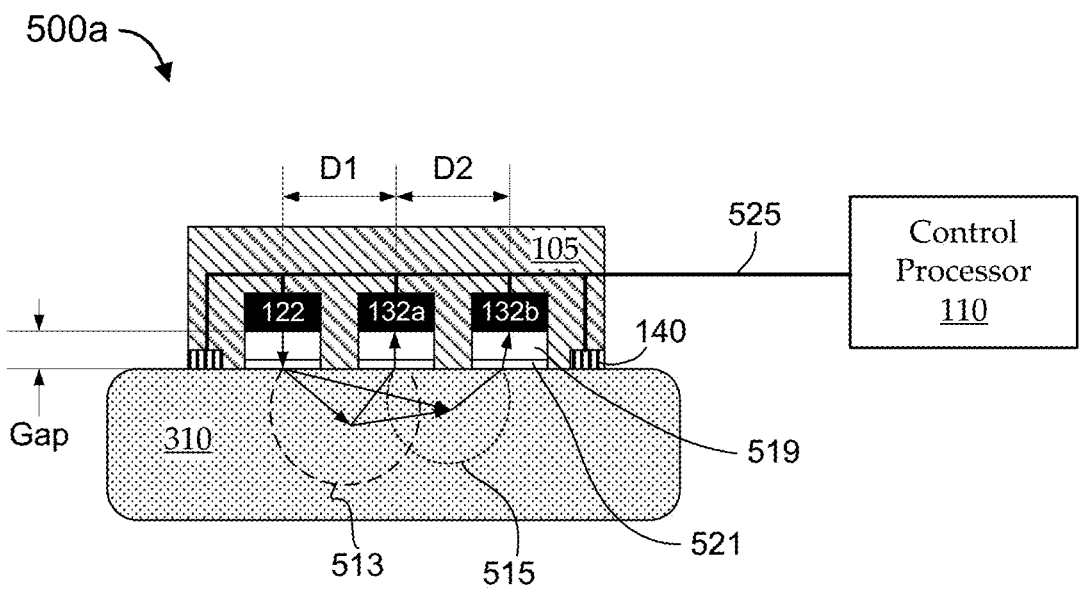
FIGS. 5A and 5B show two illustrative simplified examples of reflection-type configurations for a portable, non-invasive, dual-altitude-based blood pressure measurement system, according to various embodiments descried herein.
Figure 5B:
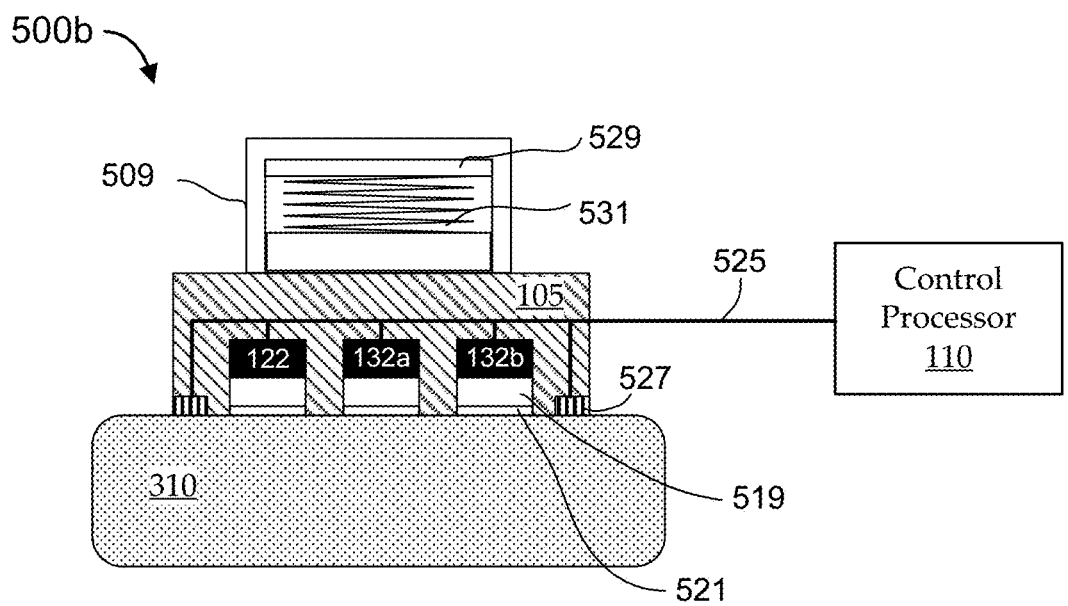

FIGS. 5A and 5B show two illustrative simplified examples of reflection-type configurations 500 for a portable, non-invasive, dual-altitude-based blood pressure measurement system, according to various embodiments descried herein. Turning first to FIG. 5A, a housing 105 is illustrated as having a sensor head integrated therewith. The sensor head is illustrated as including an illumination subsystem 120, an optical detection subsystem 130, and a contact force subsystem 140. To avoid overcomplicating the illustration, the illumination subsystem 120 is illustrated as only a single illumination source 122, and the optical detection subsystem 130 is illustrated as two photodetectors 132.

The control processor 110 is shown as separated from the housing 105 and coupled with the sensor head components via a communicative coupling 525. In some implementations, the communicative coupling 525 includes a wireless data channel, such as using optical communications, short-range radiofrequency communications (e.g., WiFi, near-field communication (NFC), Bluetooth, Zigbee, etc.), or the like. In other implementations, the communicative coupling 525 includes a wired data channel, such as a multi-wire cable, or the like. In some embodiments, the control processor 110 is housed within the housing 105. In some such embodiments, the control processor 110 is in one structure of the housing 105, and the sensor head components are in another (e.g., separable) structure of the housing 105. Though not explicitly shown, embodiments can further include an interface subsystem 150, altitude detection subsystem 160, and/or other options components. Such components can be in communication with the control processor 110 and can be integrated with any suitable housing 105 structure.

As illustrated, the reflection-type configuration 500a has the illumination source 122 and the photodetectors 132 on a same side of a body part 310. In the illustrated configuration, one of the photodetectors 132a is configured as an illumination monitor 126, and the other photodetector 132b is configured as the optical detection subsystem 130. The illumination source 122 projects illumination into the body part 310, and the projected illumination is transmitted, absorbed, reflected, scattered, and/or otherwise impacted by anatomical features of the body part 310. Some of the reflected and/or scattered illumination is received by the photodetectors 132.

The illumination source 122 and/or the photodetectors 132 can be installed in optically isolated chambers 519 with transparent windows 521 to help shield the photodetectors 132 from ambient light and/or other potential sources of degradation of the optical measurements. In some embodiments, it is desirable to implement optical components to cover a large enough region of the body part 310 surface, such that optical measurements are not negatively influenced by presence of moles, scars, hair, freckles, tattoos, shallow blood vessels, etc. Such optical coverage can be implemented in several different ways. In some implementations, the chambers 519 provide an optically shielded gap between the optical components and the surface of the body part 310 to help increase the optical coverage of those components (as an implementation of an illumination spreader 124). In some implementations, optical coverage is increased by illumination spreader 124 components, such as one or more wave guides, lenses, etc.

In other implementations, illumination spreading is realized by implementing the illumination subsystem 120 and the optical detection subsystem 130 (e.g., and the illumination monitor 126) as an arrangement of multiple illumination sources 122 and multiple photodetectors 132. For example, such an arrangement can be an array of illumination sources 122 and photodetectors 132. In some such implementations, the illumination sources 122 and photodetectors 132 are arranged in the form of one or more plus sign ('+'), each having one or more illumination sources 122 in the center, one or more photodetectors 132 at the extent of each branch as part of the optical detection subsystem 130, and one or more photodetectors 132 on each branch (between the center and the extent) as part of the illumination monitor 126. In other such implementations, the illumination sources 122 and photodetectors 132 are arranged as one or more hub-and-spoke arrangements with one or more illumination sources 122 in the hub, and one or more photodetectors 132 on each spoke as part of the optical detection subsystem 130 and/or as part of the illumination monitor 126. In other such implementations, the illumination sources 122 and photodetectors 132 are arranged as one or more concentric ring arrangements with one or more illumination sources 122 in central ring, multiple photodetectors 132 in an outer ring as part of the optical detection subsystem 130, and multiple photodetectors 132 in an intermediate ring as part of the illumination monitor 126.

In the reflection-type configuration, illumination is projected into the skin of the body part 310, and a portion of the illumination is reflected and/or scattered in the direction of the photodetectors 132. It is assumed that any change in the amount of illumination that is reflected and/or scattered over a time window is due to (or at least dominated by) the changing amount of illumination being absorbed by changes in blood volume in the illuminated portion of the body part 310. For example, the intensity of illumination detected by photodetector 132b is inversely related to the blood volume in the body part.

As noted above, one or more photodetectors 132a can be configured for illumination monitoring (as illumination monitor 126), and one or more photodetectors 132b can be configured for optical detection (as optical detection subsystem 130). For the sake of simplicity, the first photodetector 132a can be considered as detecting light passing through a first monitoring zone 513 (traveling some first distance, D1, through the body part 310), and the second photodetector 132b can be considered as detecting light passing through a second monitoring zone 515 (traveling some second distance, D2, through the body part 310, which is farther than D1). The skin (and other anatomical features in the body part) can manifest an illumination reduction gradient between the first monitoring zone 513 and the second monitoring zone 515, such that less of the projected illumination is detected by photodetector 132b than by photodetector 132a. A ratio of the amount of illumination detected by photodetector 132b to an amount of illumination detected by photodetector 132a yields a blood absorption gradient. The blood absorption gradient can be used to adjust (e.g., normalize) the output detection signal generated by the optical detection subsystem 130, such as to correct for any fluctuations in the illumination condition (e.g., in the amount or quality of illumination being projected by the illumination source 122). For example, the output detection signal (i.e., the signal indicating the changing blood volume in the body part 310) is generated using detected intensity from photodetector 132a, detected intensity from photodetector 132b, and a computed ratio between the two.

Turning to FIG. 5B, another configuration 500b is shown as substantially identical to the configuration 500a of FIG. 5A, except for the addition of active contact force subsystem 140 components. In particular, the contact force subsystem 140 is illustrated as including contact force monitors 527 and a contact force generator 509. The contact force generator 509 includes a contact force controller 529 and an active compressor 531. The contact force monitors 527 and the contact force generator 509 are electrically coupled. The contact force controller 529 is configured to control application of force by the active compressor 531 dynamically in response to feedback from the contact force monitors 527 to maintain a stable contact force between the sensor head (i.e., the portion of the housing 105 including the optical sensing components) and the body part 310. The active compressor 531 can be implemented in any suitable manner to maintain a substantially stable contact force over multiple measurement time windows. For example, the active compressor 531 can be implemented with a spring, an electromagnetic motor, a piezoelectric transducer, an air compressor, etc.

FIGS. 6A-6D show simplified illustrations of example reflection-type configurations 600. Each configuration can be an implementation of a configuration, such as those described with reference to FIGS. 5A and 5B. Each is illustrated generally as a wearable housing 105 with a housing base 620 configured to be in contact with the skin surface of a body part 310. A sensor head 610 is integrated with the housing 105 and includes at least an illumination subsystem 120 and an optical detection subsystem 130. The housing 105 is configured to locate the illumination sources 122 and the photodetectors 132 on a same side of the body part. Implementations of the sensor head 610 in each configuration 600 can also include optically supporting components, such as one or more of an illumination spreader 124, illumination monitor 126, etc. Further, though not explicitly shown, some embodiments of the housing 105 in each configuration 600 can further integrate one or more of the control processor 110, interface subsystem 150, the altitude detection subsystem 160, etc. Though not explicitly shown in all of FIGS. 6A-6D, each configuration 600 can include any suitable active and/or passive contact force subsystem 140. As described herein, the contact force subsystem 140 produces a stable contact force between the housing base 620 and the skin surface of the body part 310 at least in the region of the sensor head 610. For example, in FIG. 6A, the contact force subsystem 140 can be implemented as an elastic band, or the like.

Figure 6A:
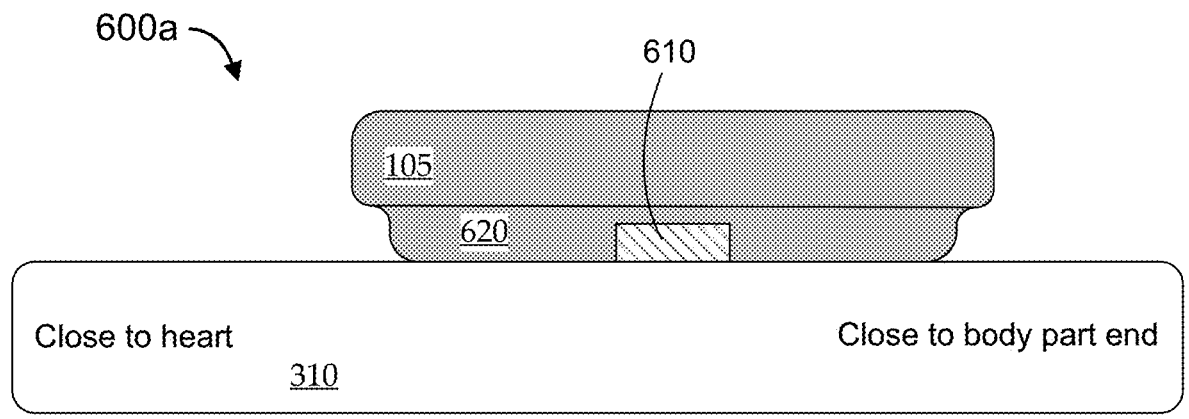
FIGS. 6A-6D show simplified illustrations of example reflection-type configurations.

In the configuration 600a of FIG. 6A, a single housing 105 is shown as integrating all components of the system. Such a configuration 600a can be implemented, for example, in a wristwatch form factor, or the like. In the configuration 600b of FIG. 6B, the sensor head 610 is spaced away from the remainder of the housing base 620 by a gap. In such a configuration 600b, a holding force can be applied to secure the housing base 620 against the body part 310, but the holding force can be isolated from the sensor head 610. The contact force subsystem 140 can measure the contact force (e.g., and/or control the contact force) as between the sensor head 610 and the body part 310. Because blood flow in the body part 310 can be affected by the holding force, the configuration 600b is shown as having the sensor head 610 located to the side of the housing 105 closer to the user's heart.

Figure 6B:
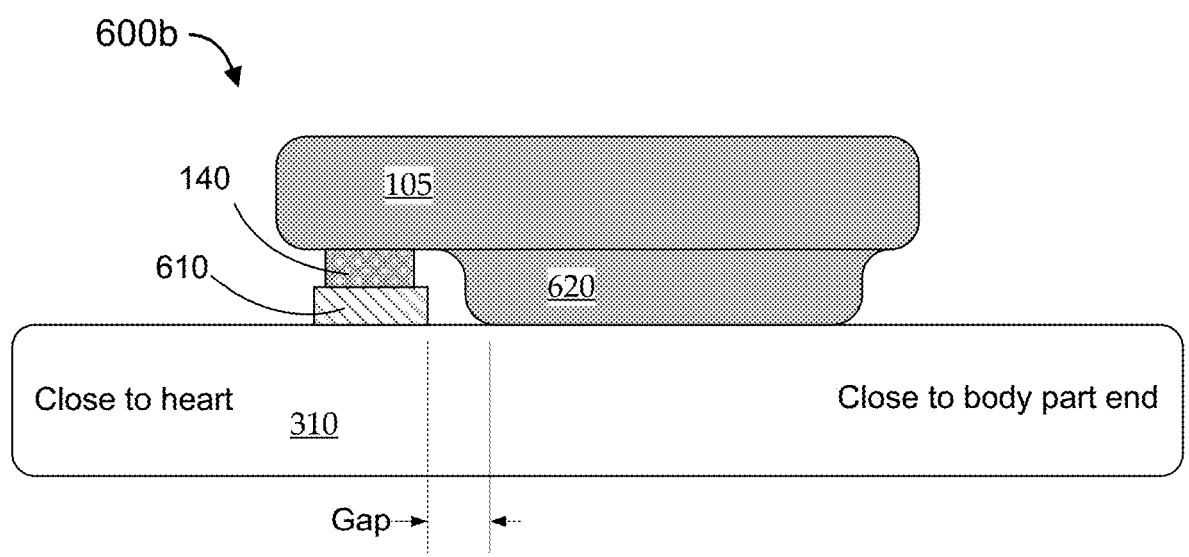
Figure 6C:
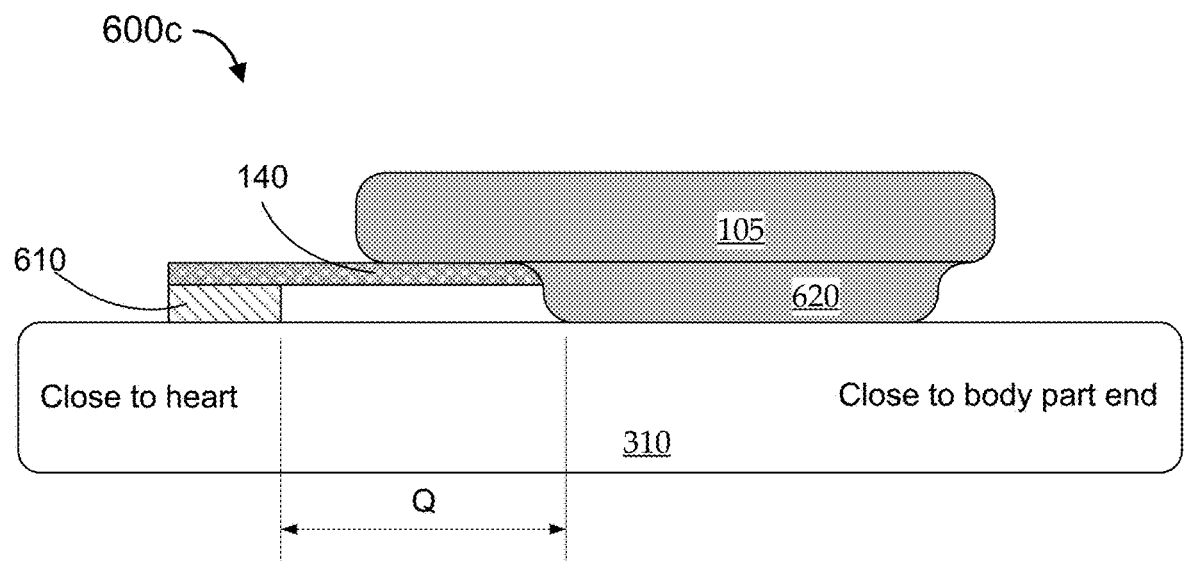

The configuration 600c of FIG. 6C is similar to the configuration 600b of FIG. 6B, except that the spacing of the sensor head 610 away from the remainder of the housing base 620 is controllable over some distance, Q. For example, a slidable structure can be extended and/or retracted to move the sensor head 610 relative to the housing base 620. As in FIG. 6B, in configuration 600c, a holding force can be applied to secure the housing base 620 against the body part 310, but the holding force can be isolated from the sensor head 610. The slidable structure can integrate the contact force subsystem 140, such that the contact force subsystem 140 can measure the contact force (e.g., and/or control the contact force) as between the sensor head 610 and the body part 310. As in FIG. 6B, the configuration 600c is shown as having the sensor head 610 located to the side of the housing 105 closer to the user's heart.

Figure 6D:
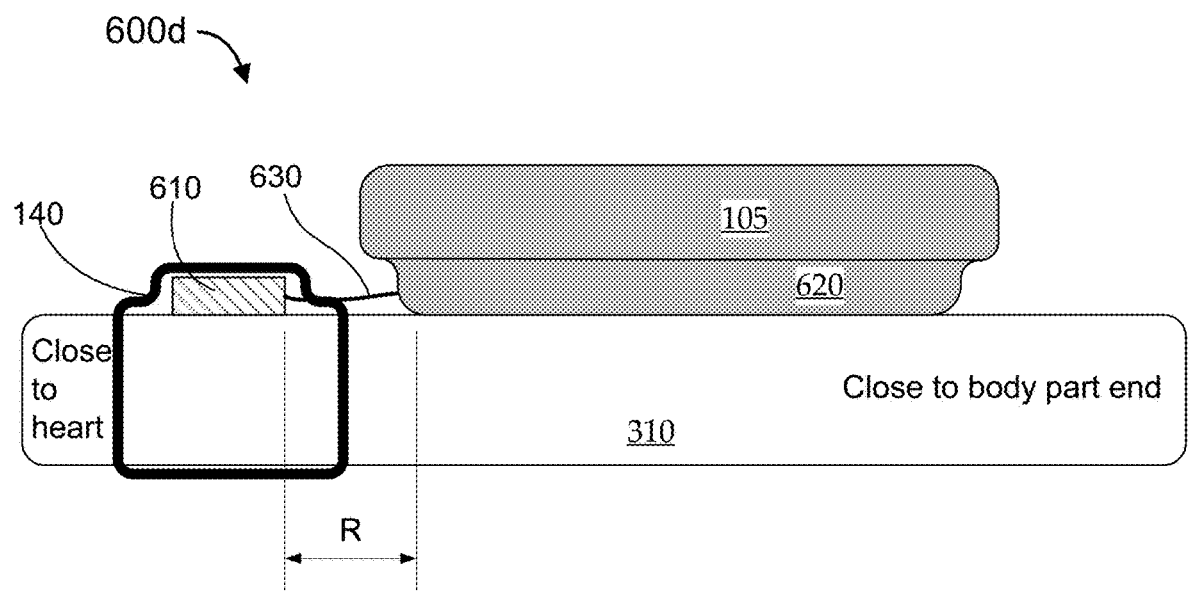

The configuration 600d of FIG. 6D is similar to the configuration 600c of FIG. 6C, except that the sensor head 610 and the remainder of the housing 105 (including the housing base 620) are flexibly coupled via a wired or wireless connection. As separable structures, the sensor head 610 can be spaced away from the remainder of the housing base 620 by distance, R. In such a configuration 600d, a holding force may or may not be applied to secure the housing base 620 against the body part 310. For example, the housing base 620 (e.g., with an integrated power system, control processor 110, interface subsystem 150, etc.) can be integrated in a wearable package, or in a package that is configured to be held, placed in a pocket, clipped to a belt, etc.; while the sensor head 610 is integrated into a separate wearable package. If there is a holding force applied to the housing base 620, that holding force can be isolated from the sensor head 610. The packaging of the sensor head 610 can include the contact force subsystem 140, such that the contact force subsystem 140 can measure the contact force (e.g., and/or control the contact force) as between the sensor head 610 and the body part 310. In one implementation, the housing base 620 is implemented in a wristwatch or bracelet, and the sensor head 610 is implemented with an elastic strap to be strapped onto the forearm above the wrist. In another implementation, the housing base 620 is implemented in an armband to strap to the bicep, and the sensor head 610 is implemented as a ring to be worn on the user's finger. In general, configuration can either position the sensor head 610 to the side of the housing 105 closer to the user's heart relative to the housing base 620, or far enough from the housing base 620 to avoid detrimental impacts of housing base 620 holding force on blood blow in the region of the sensor head 610. In embodiments having the sensor head 610 spaced away from other portions of the system, the "body part 310" refers to the body part 310 where the sensor head 610 is located.

Figure 7A:
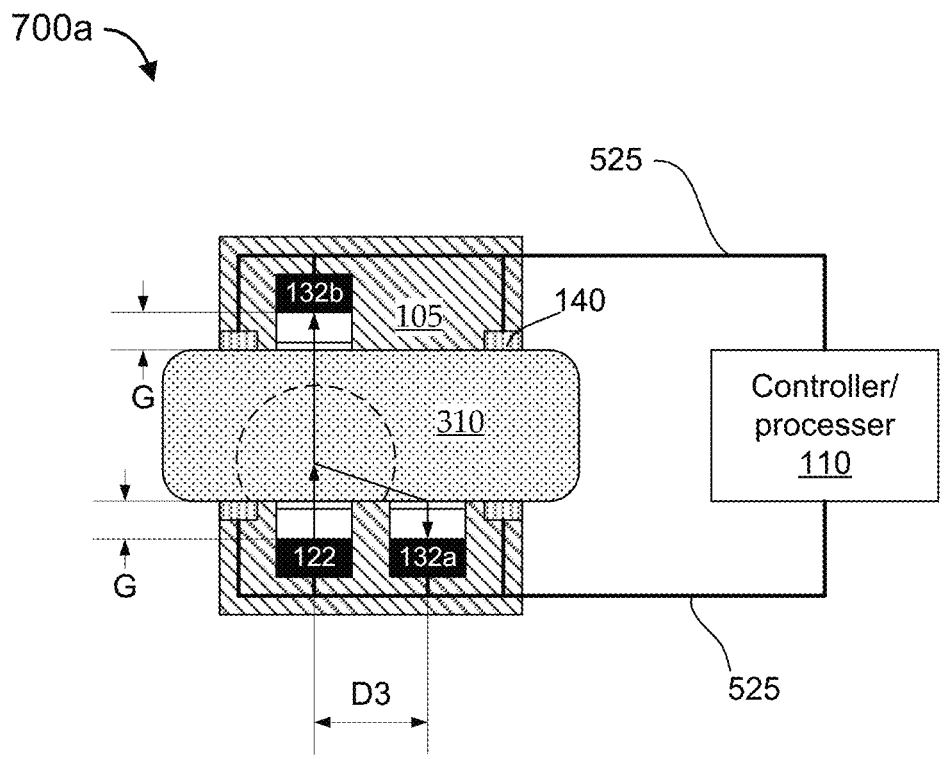
FIGS. 7A and 7B show two illustrative simplified examples of transmission-type configurations for a portable, non-invasive, dual-altitude-based blood pressure measurement system, according to various embodiments descried herein.
Figure 7B:
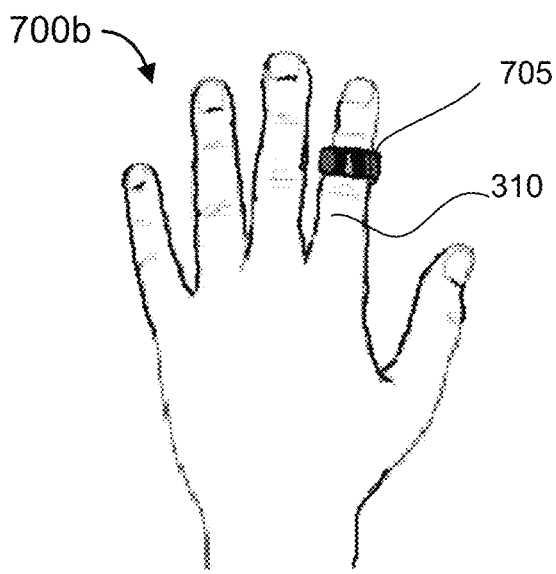

FIGS. 7A and 7B show two illustrative simplified examples of transmission-type configurations 700 for a portable, non-invasive, dual-altitude-based blood pressure measurement system, according to various embodiments descried herein. Turning first to FIG. 7A, a housing 105 is illustrated as having a sensor head integrated therewith. The sensor head is illustrated as including an illumination subsystem 120, an optical detection subsystem 130, an illumination monitor 126, and a contact force subsystem 140. To avoid overcomplicating the illustration, the illumination subsystem 120 is illustrated as only a single illumination source 122, the illumination monitor 126 is implemented as a single photodetector 132a, and the optical detection subsystem 130 is illustrated as a single photodetector 132b.

The control processor 110 is shown as separated from the housing 105 and coupled with the sensor head components via a communicative coupling 525. In some implementations, the communicative coupling 525 includes a wireless data channel, such as using optical communications, short-range radiofrequency communications (e.g., WiFi, near-field communication (NFC), Bluetooth, Zigbee, etc.), or the like. In other implementations, the communicative coupling 525 includes a wired data channel, such as a multi-wire cable, or the like. In some embodiments, the control processor 110 is housed within the housing 105. In some such embodiments, the control processor 110 is in one structure of the housing 105, and the sensor head components are in another (e.g., separable) structure of the housing 105. Though not explicitly shown, embodiments can further include an interface subsystem 150, altitude detection subsystem 160, and/or other options components. Such components can be in communication with the control processor 110 and can be integrated with any suitable housing 105 structure.

As illustrated, the transmission-type configuration 700a has the illumination source 122 and the photodetector 132b of the optical detection subsystem 130 on opposite sides of a body part 310. The illumination source 122 projects illumination into the body part 310, and the projected illumination is transmitted, absorbed, reflected, scattered, and/or otherwise impacted by anatomical features of the body part 310. Some of the transmitted illumination that is not absorbed by the blood volume in the body part 310 is received by photodetector 132b. In some implementations (as illustrated), the photodetector 132a of the illumination monitor 126 can be located on a same side of the body part 310 as the illumination source 122, such that the photodetector 132a received reflected and/or scattered illumination. As described with reference to FIG. 5A, the illumination source 122 and/or the photodetectors 132 can be configured for optical isolation, increased optical coverage, etc. For example, components can be installed in optically isolated chambers, optically coupled with illumination spreader 124 components, etc. Further, multiple sets of illumination sources 122 and photodetectors 132 can be used to increase optical coverage, detection accuracy, etc.

In the transmission-type configuration, illumination passes through the body part, from the side with the illumination source 122 to the opposite side with the photodetectors 132b. It is assumed that any change in the amount of illumination that passes through the entire body part 310 over a time window is due to (or at least dominated by) the changing amount of illumination being absorbed by changes in blood volume in the illuminated portion of the body part 310. For example, the intensity of illumination detected by photodetector 132b is inversely related to the blood volume in the body part. With photodetector 132a and photodetector 132b on opposite sides of the body part 310, anatomical features within the body part 310 manifest an illumination reduction gradient, such that less of the projected illumination is detected by photodetector 132b than by photodetector 132a. As described above, a ratio of the amount of illumination detected by photodetector 132b to an amount of illumination detected by photodetector 132a yields a blood absorption gradient, and the blood absorption gradient can be used to adjust (e.g., normalize) the output detection signal generated by the optical detection subsystem 130, such as to correct for any fluctuations in the illumination condition (e.g., in the amount or quality of illumination being projected by the illumination source 122).

FIG. 7B shows an example implementation of the configuration 700a in a ring-type form factor. As illustrated, at least the sensor head components are integrated into a wearable ring structure 705 (as an implementation of the housing 105) to be worn on a finger (body part 310). The ring structure itself can provide a sufficiently stable contact force, or the ring structure 705 can integrate active contact force subsystem 140 components.

Figure 8:
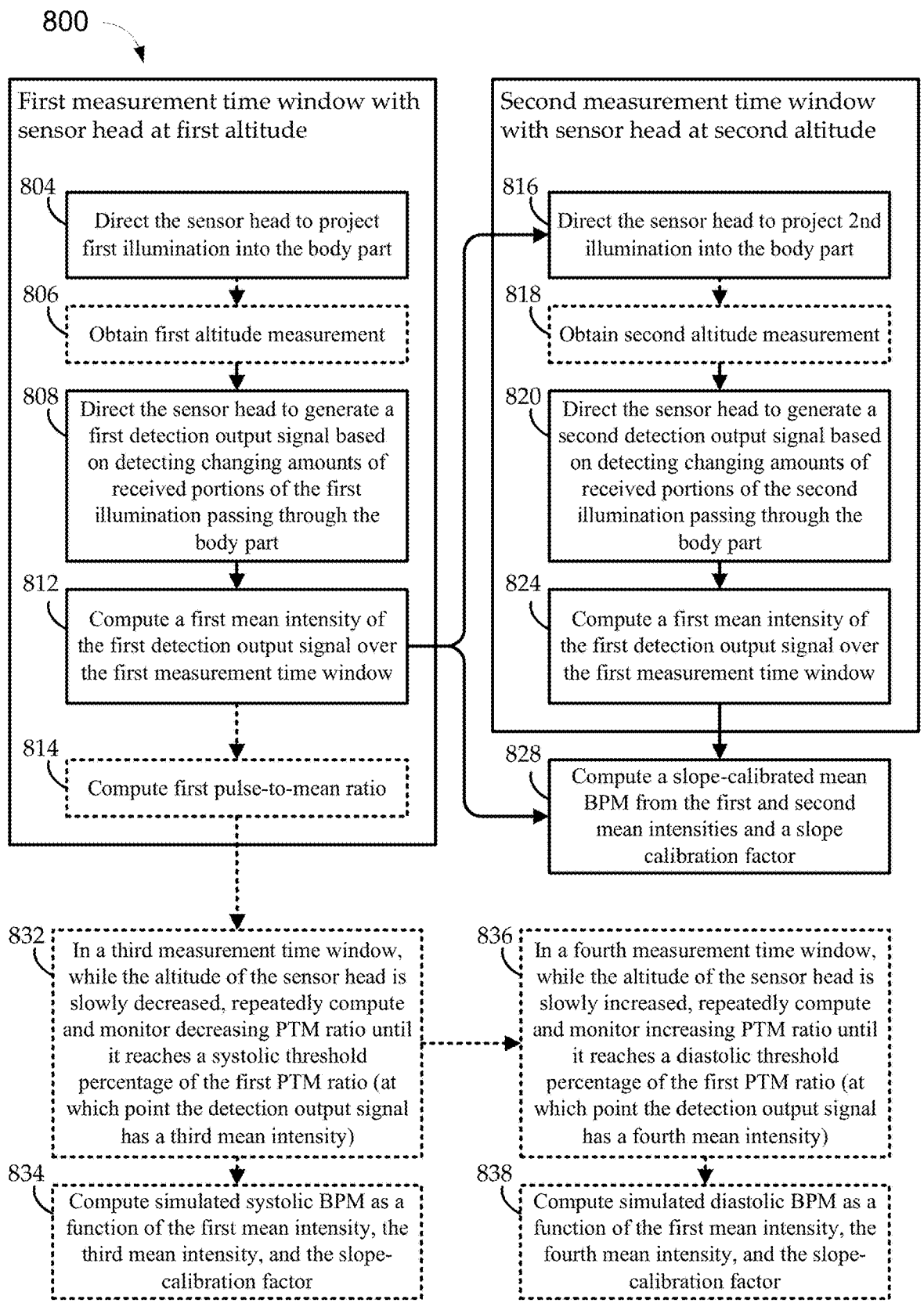
FIG. 8 shows a flow diagram of an illustrative method for non-invasive measurement of blood pressure of a user using a portable measurement system having a sensor head located on a body part of the user, according to various embodiments described herein.

FIG. 8 shows a flow diagram of an illustrative method 800 for non-invasive measurement of blood pressure of a user using a portable measurement system having a sensor head located on a body part of the user, according to various embodiments described herein. Embodiments of the method 800 can be implemented using any of the above reflection-type configurations, transmission-type configurations, or any other suitable system configurations. The dual-altitude-based measurement approach generally involves at least two measurement time windows, where the second measurement time window follows directly after, or shortly after, the first measurement time window. In the first measurement time window, at least the sensor head is positioned at a first altitude relative to the heart. In the second measurement time window, at least the sensor head is positioned at a second altitude relative to the heart. For example, the first altitude is substantially at the altitude of the heart, and the second altitude is a few hundred millimeters (e.g., an arm's length) below the altitude of the heart.

Stages 804-812 correspond to a first measurement sub-routine in a first measurement time window, and stages 816-824 correspond to a second measurement sub-routine in a second measurement time window. Each measurement sub-routine can be performed in a substantially identical manner to obtain a respective mean intensity measurement. At stage 804 (i.e., in the first measurement time window with the body part held positioned at the first altitude relative to the user's heart), embodiments can direct the sensor head to project first illumination into the body part, the body part including at least one elastic blood circulatory pathway through which flows a continuously changing volume of blood. At stage 808, embodiments can direct the sensor head to generate a first detection output signal based on detecting changing amounts of received portions of the first illumination passing through the body part corresponding to the continuously changing volume of blood. At stage 812, embodiments can compute a first mean intensity of the first detection output signal over the first measurement time window.

At stage 816 (i.e., in the second measurement time window with the body part held positioned at the second altitude relative to the user's heart), embodiments can direct the sensor head to project second illumination into the body part. The second illumination can be nominally identical to the first illumination (i.e., designed to be the same color, intensity, etc.). At stage 820, embodiments can direct the sensor head to generate a second detection output signal based on detecting changing amounts of received portions of the second illumination passing through the body part corresponding to the continuously changing volume of blood. At stage 824, embodiments can compute a second mean intensity of the second detection output signal over the first measurement time window.

At stage 828, embodiments can compute a slope-calibrated mean blood pressure measurement (BPM) as a function of the first mean intensity, the second mean intensity, and a slope-calibration factor. Some embodiments further include, at stage 806 (in the first measurement time window), obtaining a measurement of the first altitude by an altitude sensor. Such embodiments can further include, at stage 818 (in the second measurement time window), obtaining a measurement of the second altitude by the altitude sensor. Though not explicitly shown as a stage of the method 800, some embodiments further include maintaining a stable contact force between the sensor head and the body part during at least the first and second measurement time windows. Such maintaining can include controlling a force generator to controllably produce the contact force responsive to a monitoring signal that is output by a force monitor to indicate a present magnitude of the contact force being produced by the force generator.

Some embodiments can further compute a systolic BPM. For example, at stage 814, in the first measurement time window, embodiments can further compute a first pulse to mean (PTM) ratio as a ratio between an intensity amplitude of the first detection output signal in the first measurement time window and the first mean intensity. At stage 832, in a third measurement time window after the first (and/or second) measurement time window, while the altitude of the sensor head is slowly decreased from the first altitude to some third altitude, embodiments can repeatedly compute and monitor a decreasing PTM ratio until the decreasing PTM ratio reaches a second PTM ratio that is at or below a predetermined systolic threshold percentage (e.g., 90 percent) of the first PTM ratio. The monitoring can be based on monitoring changing values of the intensity amplitude and the mean intensity of the detection output signal resulting from the body part transitioning from the first altitude to the third altitude. The second PTM is computed when the detection output signal has a third mean intensity. At stage 834, embodiments can compute a simulated systolic BPM as a function of the first mean intensity, the third mean intensity, and the slope-calibration factor.

Some embodiments can further compute a diastolic BPM. For example, at stage 836, in a fourth measurement time window subsequent to the third (and/or second) measurement time window, while the altitude of the sensor head is slowly increased from the third (or second) altitude to some fourth altitude, embodiments can repeatedly compute and monitor an increasing PTM ratio until the increasing PTM ratio reaches a third PTM ratio that is at or above a predetermined diastolic threshold percentage (e.g., 110 percent) of the first PTM ratio. The monitoring can be based on monitoring changing values of the intensity amplitude and the mean intensity of the detection output signal resulting from the body part transitioning to the fourth altitude. The third PTM is computed when the detection output signal has a fourth mean intensity. At stage 838, embodiments can compute a simulated diastolic BPM as a function of the first mean intensity, the fourth mean intensity, and the slope-calibration factor.

Figure 9:
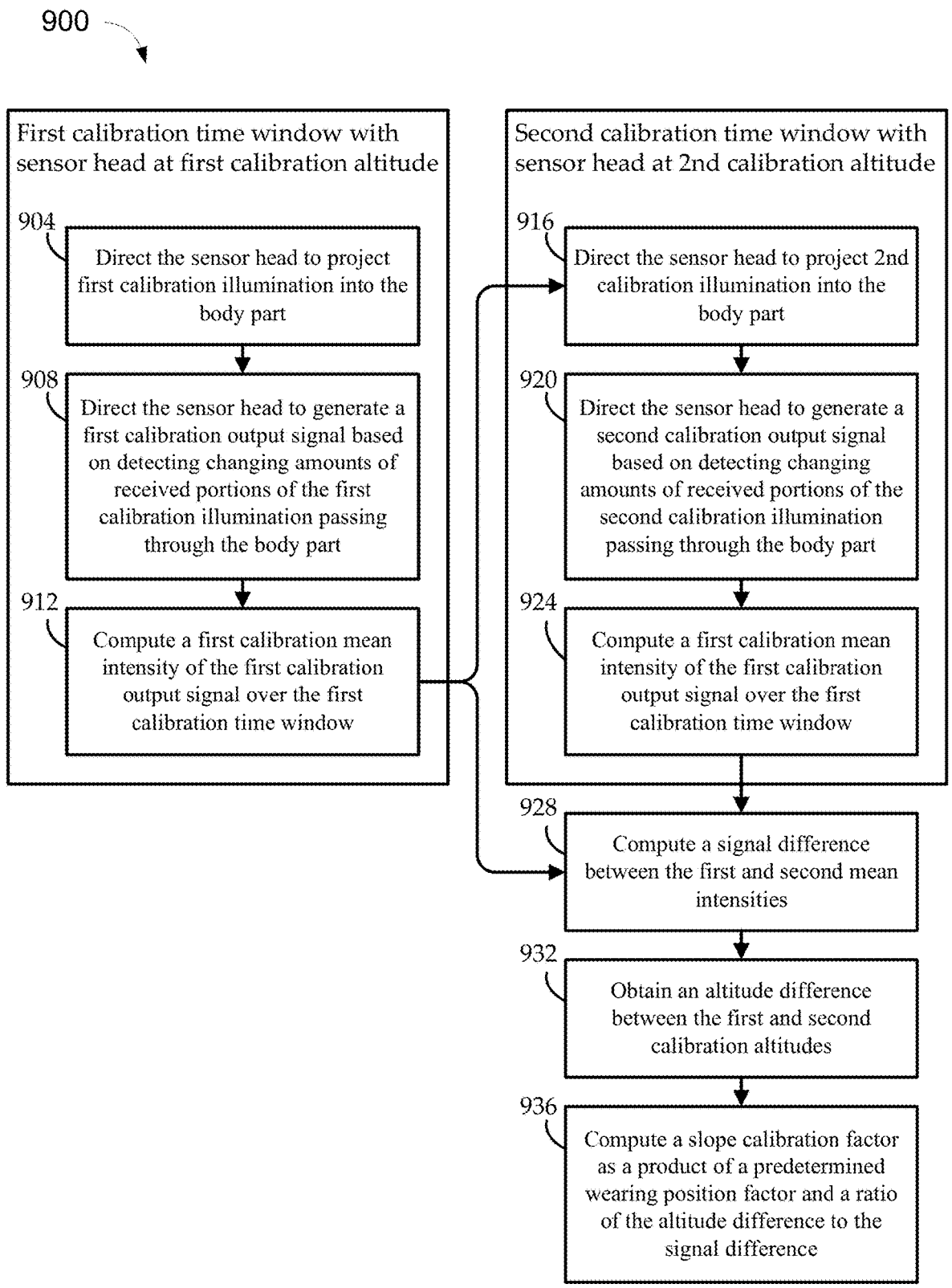
FIG. 9 shows a flow diagram of an illustrative method for calibrating a non-invasive measurement of blood pressure of a user using a portable measurement system having a sensor head located on a body part of the user, according to various embodiments described herein.

FIG. 9 shows a flow diagram of an illustrative method 900 for calibrating a non-invasive measurement of blood pressure of a user using a portable measurement system having a sensor head located on a body part of the user, according to various embodiments described herein. The calibration routine can substantially follow the measurement routine described in FIG. 8. For example, stages 904-912 can correspond to a first calibration time window, and stages 916-924 can correspond to a second calibration time window. Embodiments can begin at stage 904 (in the first calibration time window, prior to the first measurement time window, with the body part held positioned at the first altitude) by directing the sensor head to project first calibration illumination into the body part. At stage 908, embodiments can direct the sensor head to generate a first calibration output signal based on detecting changing amounts of received portions of the first calibration illumination passing through the body part corresponding to the continuously changing volume of blood. At stage 912, embodiments can compute a first calibration mean intensity of the first calibration output signal over the first calibration time window.

At stage 916 (in the second calibration time window, prior to the first measurement time window and subsequent to the first calibration time window, with the body part held positioned at the second altitude), embodiments can direct the sensor head to project second calibration illumination into the body part. At stage 920, embodiments can direct the sensor head to generate a second calibration output signal based on detecting changing amounts of received portions of the second calibration illumination passing through the body part corresponding to the continuously changing volume of blood. At stage 924, embodiments can compute a second calibration mean intensity of the second calibration output signal over the second calibration time window.

At stage 928, embodiments can compute a signal difference between the first calibration mean and the second calibration mean. At stage 932, embodiments can obtain an altitude difference between the first calibration altitude and the second calibration altitude. At stage 936, embodiments can compute the slope calibration factor as a product of a predetermined wearing position factor and a ratio of the altitude difference to the signal difference.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A system for non-invasive measurement of blood pressure of a user, the system comprising:
    a sensor head comprising:
        an illumination subsystem to project illumination through a body part that includes at least one elastic blood circulatory pathway through which flows a continuously changing volume of blood; and
        an optical detection subsystem to generate a detection output signal based on detecting changing amounts of received portions of the illumination passing through the body part corresponding to the continuously changing volume of blood; and
    a control processor to generate a blood pressure measurement (BPM) output by:
        in a first measurement time window with the body part held positioned at a first altitude relative to the user's heart, directing the illumination subsystem to project the illumination through the body part, directing the optical detection subsystem to generate the detection output signal, and computing a first mean intensity of the detection output signal over the first measurement time window;
        in a second measurement time window with the body part held positioned at a second altitude relative to the user's heart, directing the illumination subsystem to project the illumination through the body part, directing the optical detection subsystem to generate the detection output signal, and computing a second mean intensity of the detection output signal over the second measurement time window; and
        computing the BPM output to indicate a slope-calibrated mean BPM as a function of the first mean intensity, the second mean intensity, and a slope-calibration factor,
    wherein the optical detection subsystem comprises a plurality of photodetectors to detect the received portions of the illumination passing through the body part, at least a first photodetector of the plurality of photodetectors configured to output an illumination stability signal indicating a quality of the received portions of the illumination, and at least a second photodetector of the plurality of photodetectors configured to output an illumination gradient signal indicating an intensity of the received portions of the illumination; and
    the optical detection subsystem is to generate the detection output signal based on illumination gradient signal as normalized by the illumination stability signal.

2. The system of claim 1, wherein the control processor is to generate the BPM output to include a simulated systolic BPM by:
    in the first measurement time window, further computing a first pulse to mean (PTM) ratio as a ratio between an intensity amplitude of the detection output signal in the first measurement time window and the first mean intensity;
    in a third measurement time window, subsequent to the first measurement time window, repeatedly computing and monitoring a decreasing PTM ratio while an altitude of the body part slowly decreases from the first altitude, based on monitoring changing values of the intensity amplitude and the mean intensity of the detection output signal resulting from the body part decreasing in altitude, until the decreasing PTM ratio reaches a second PTM ratio that is at or below a predetermined systolic threshold percentage of the first PTM ratio, such that the second PTM is computed when the body part reaches a third altitude at which the detection output signal has a third mean intensity; and
    computing the simulated systolic BPM as a function of the first mean intensity, the third mean intensity, and the slope-calibration factor.

3. The system of claim 2, wherein the control processor is to generate the BPM output to include a simulated diastolic BPM by:
    in a fourth measurement time window subsequent to at least the third measurement time window, repeatedly computing and monitoring an increasing PTM ratio while the altitude of the body part slowly increases from at least the third altitude, based on monitoring changing values of the intensity amplitude and the mean intensity of the detection output signal resulting from the body part increasing in altitude, until the increasing PTM ratio reaches a third PTM ratio that is at or above a predetermined diastolic threshold percentage of the first PTM ratio, such that the third PTM is computed when the body part reaches a fourth altitude at which the detection output signal has a fourth mean intensity; and computing the simulated diastolic BPM as a function of the first mean intensity, the fourth mean intensity, and the slope-calibration factor.

4. The system of claim 1, further comprising:
an altitude sensor to output the first altitude in the first measurement time window and to output the second altitude in the second measurement time window.

5. The system of claim 1, wherein the slope-calibration factor includes an altitude difference factor computed by the control processor during a calibration routine, prior to the generating the BPM output, by applying a predetermined gravitational factor to a measured difference between the first altitude and the second altitude.

6. The system of claim 1, wherein the control processor is further to compute the slope-calibration factor during a calibration routine, prior to the generating the BPM output, by:
in a first calibration time window with the body part held positioned at a first calibration altitude relative to the user's heart, directing the illumination subsystem to project the illumination through the body part, directing the optical detection subsystem to generate the detection output signal, and computing a first calibration mean intensity of the detection output signal over the first calibration time window;
in a second calibration time window with the body part held positioned at a second calibration altitude relative to the user's heart, directing the illumination subsystem to project the illumination through the body part, directing the optical detection subsystem to generate the detection output signal, and computing a second calibration mean intensity of the detection output signal over the second calibration time window;
computing a signal difference between the first calibration mean and the second calibration mean;
obtaining an altitude difference between the first calibration altitude and the second calibration altitude; and
computing the slope calibration as a product of a predetermined wearing position factor and a ratio of the altitude difference to the signal difference.

7. The system of claim 1, further comprising:
a wearable housing comprising a contact force subsystem configured to maintain a stable contact force between the sensor head and the body part during at least the first and second measurement time windows.

8. The system of claim 7, wherein:
the contact force subsystem comprises:
a force generator to controllably produce the contact force between the sensor head and the body part; and
a force monitor to output a monitoring signal indicating a present magnitude of the contact force being produced by the force generator; and
the control processor is further coupled with the contact force subsystem to control the force generator responsive to the monitoring signal to maintain the stable contact force between the sensor head and the body part during at least the first and second measurement time windows.

9. The system of claim 1, further comprising:
a wearable housing configured to position the sensor head at the body part, the body part being a forearm, wrist, or finger of the user, so that bending and extending the user's elbow transitions the sensor head between the first altitude and the second altitude.

10. The system of claim 1, wherein:
each photodetector of the plurality of photodetectors is installed in a respective chamber having a transparent window configured to be pointed at the body part, such that the photodetector detects only the received portions of the illumination passing through the body part and into the transparent window, and the photodetector is otherwise optically isolated by the respective chamber.

11. The system of claim 1, wherein the illumination subsystem projects the illumination at a wavelength of between 600 and 1100 nanometers.

12. The system of claim 1, wherein:
at least one illumination source of the illumination subsystem and at least one photodetector of the optical detection subsystem are configured to be located on a same side of the body part, such that the received portions of the illumination passing through the body part correspond to portions of the illumination projected into the body part by the at least one illumination source, reflected back out of the body part, and received by the at least one photodetector without absorption by the continuously changing blood volume.

13. The system of claim 1, wherein:
at least one illumination source of the illumination subsystem and at least one photodetector of the optical detection subsystem are configured to be located on opposite sides of the body part, such that the received portions of the illumination passing through the body part correspond to portions of the illumination projected into the body part by the at least one illumination source, passing completely through the body part, and received by the at least one photodetector without absorption by the continuously changing blood volume.

14. A method for non-invasive measurement of blood pressure of a user using a portable measurement system having a sensor head located on a body part of the user, the method comprising:
in a first measurement time window with the body part held positioned at a first altitude relative to the user's heart:
directing the sensor head to project first illumination into the body part, the body part including at least one elastic blood circulatory pathway through which flows a continuously changing volume of blood;
directing the sensor head to generate a first detection output signal based on detecting changing amounts of received portions of the first illumination passing through the body part corresponding to the continuously changing volume of blood; and
computing a first mean intensity of the first detection output signal over the first measurement time window;
in a second measurement time window with the body part held positioned at a second altitude relative to the user's heart:
directing the sensor head to project second illumination into the body part;
directing the sensor head to generate a second detection output signal based on detecting changing amounts of received portions of the second illumination passing through the body part corresponding to the continuously changing volume of blood; and computing a second mean intensity of the second detection output signal over the first measurement time window;

computing a slope-calibrated mean blood pressure measurement (BPM) as a function of the first mean intensity, the second mean intensity, and a slope-calibration factor;

in the first measurement time window, further computing a first pulse to mean (PTM) ratio as a ratio between an intensity amplitude of the first detection output signal in the first measurement time window and the first mean intensity;

in a third measurement time window, subsequent to the first measurement time window, repeatedly computing and monitoring a decreasing PTM ratio while an altitude of the body part slowly decreases from the first altitude, based on monitoring changing values of the intensity amplitude and the mean intensity of the detection output signal resulting from the body part decreasing in altitude, until the decreasing PTM ratio reaches a second PTM ratio that is at or below a predetermined systolic threshold percentage of the first PTM ratio, such that the second PTM is computed when the body part reaches a third altitude at which the detection output signal has a third mean intensity; and computing the simulated systolic BPM as a function of the first mean intensity, the third mean intensity, and the slope-calibration factor.

15. The method of claim 14, further comprising:
in a fourth measurement time window subsequent to at least the third measurement time window, repeatedly computing and monitoring an increasing PTM ratio while the altitude of the body part slowly increases from at least the third altitude, based on monitoring changing values of the intensity amplitude and the mean intensity of the detection output signal resulting from the body part increasing in altitude, until the increasing PTM ratio reaches a third PTM ratio that is at or above a predetermined diastolic threshold percentage of the first PTM ratio, such that the third PTM is computed when the body part reaches a fourth altitude at which the detection output signal has a fourth mean intensity; and computing the simulated diastolic BPM as a function of the first mean intensity, the fourth mean intensity, and the slope-calibration factor.

16. The method of claim 14, further comprising:
in the first measurement time window, obtaining a measurement of the first altitude by an altitude sensor; and
in the second measurement time window, obtaining a measurement of the second altitude by the altitude sensor.

17. The method of claim 14, further comprising:
in a first calibration time window prior to the first measurement time window, with the body part held positioned at the first altitude:
 directing the sensor head to project first calibration illumination into the body part;
 directing the sensor head to generate a first calibration output signal based on detecting changing amounts of received portions of the first calibration illumination passing through the body part corresponding to the continuously changing volume of blood; and
 computing a first calibration mean intensity of the first calibration output signal over the first calibration time window;

in a second calibration time window prior to the first measurement time window and subsequent to the first calibration time window, with the body part held positioned at the second altitude:
 directing the sensor head to project second calibration illumination into the body part;
 directing the sensor head to generate a second calibration output signal based on detecting changing amounts of received portions of the second calibration illumination passing through the body part corresponding to the continuously changing volume of blood; and
 computing a second calibration mean intensity of the second calibration output signal over the second calibration time window;

computing a signal difference between the first calibration mean and the second calibration mean;
obtaining an altitude difference between the first calibration altitude and the second calibration altitude; and
computing the slope calibration as a product of a predetermined wearing position factor and a ratio of the altitude difference to the signal difference.

18. The method of claim 14, further comprising:
maintaining a stable contact force between the sensor head and the body part during at least the first and second measurement time windows by controlling a force generator to controllably produce the contact force responsive to a monitoring signal that is output by a force monitor to indicate a present magnitude of the contact force being produced by the force generator.

19. A system for non-invasive measurement of blood pressure of a user, the system comprising:
a sensor head comprising:
 an illumination subsystem to project illumination through a body part that includes at least one elastic blood circulatory pathway through which flows a continuously changing volume of blood; and
 an optical detection subsystem to generate a detection output signal based on detecting changing amounts of received portions of the illumination passing through the body part corresponding to the continuously changing volume of blood; and
a control processor to generate a blood pressure measurement (BPM) output by:
 in a first measurement time window with the body part held positioned at a first altitude relative to the user's heart, directing the illumination subsystem to project the illumination through the body part, directing the optical detection subsystem to generate the detection output signal, and computing a first mean intensity of the detection output signal over the first measurement time window;
 in a second measurement time window with the body part held positioned at a second altitude relative to the user's heart, directing the illumination subsystem to project the illumination through the body part, directing the optical detection subsystem to generate the detection output signal, and computing a second mean intensity of the detection output signal over the second measurement time window; and
 computing the BPM output to indicate a slope-calibrated mean BPM as a function of the first mean intensity, the second mean intensity, and a slope-calibration factor, wherein the control processor is to generate the BPM output to include a simulated systolic BPM by:

in the first measurement time window, further computing a first pulse to mean (PTM) ratio as a ratio between an intensity amplitude of the detection output signal in the first measurement time window and the first mean intensity;

in a third measurement time window, subsequent to the first measurement time window, repeatedly computing and monitoring a decreasing PTM ratio while an altitude of the body part slowly decreases from the first altitude, based on monitoring changing values of the intensity amplitude and the mean intensity of the detection output signal resulting from the body part decreasing in altitude, until the decreasing PTM ratio reaches a second PTM ratio that is at or below a predetermined systolic threshold percentage of the first PTM ratio, such that the second PTM is computed when the body part reaches a third altitude at which the detection output signal has a third mean intensity; and computing the simulated systolic BPM as a function of the first mean intensity, the third mean intensity, and the slope-calibration factor.

\* \* \* \* \*